United States Patent
Watanabe et al.

(10) Patent No.: US 6,198,500 B1
(45) Date of Patent: Mar. 6, 2001

(54) MULTI-POINT CONFERENCE SYSTEM AND CONFERENCE TERMINAL DEVICE

(75) Inventors: Hideaki Watanabe; Kiyoshi Sakai, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/243,852

(22) Filed: Feb. 3, 1999

(30) Foreign Application Priority Data

Feb. 3, 1998 (JP) .................................................. 10-021661

(51) Int. Cl.[7] ........................................................ H04N 7/14
(52) U.S. Cl. ........................... 348/17; 348/15; 375/240.13
(58) Field of Search ........................... 348/14–17, 400.01, 348/409.1; 379/93.08, 93.21, 202; 345/330; 709/204; 370/260; 386/111–112; 375/240.12, 240.13

(56) References Cited

U.S. PATENT DOCUMENTS

| 5,684,527 | * | 11/1997 | Terui et al. ............................ 379/202 |
| 5,898,461 | * | 4/1999 | Ohsawa et al. .................. 375/240.12 |
| 6,078,721 | * | 6/2000 | Uchimi et al. ........................ 386/111 |

FOREIGN PATENT DOCUMENTS

| 2-87789 | 3/1990 | (JP) . |
| 3-99592 | 4/1991 | (JP) . |
| 5-328344 | 12/1993 | (JP) . |

* cited by examiner

*Primary Examiner*—Curtis A. Kuntz
*Assistant Examiner*—George Eng
(74) *Attorney, Agent, or Firm*—Helfgott & Karas, PC.

(57) ABSTRACT

A multi-point conference system includes a plurality of conference terminal devices coupled to each other, image information and voice information being transmitted among the plurality of conference terminal devices so that users of the plurality of conference terminal devices are in conference with each other. A coding process unit of a transmission side conference terminal device codes image information by switching an intra-frame coding operation and an interframe coding operation and transmit coded image information when the each of the plurality of terminal devices is specified by a speaker specifying information item. The coding process unit of the transmission side conference terminal device which is specified again by a speaker identifying information item codes image information by an interframe coding operation starting from a head frame. A decoding process unit of a receiving side conference terminal device which receives the coded information from the transmission side conference terminal device decodes the coded information by the decoding operation corresponding to the interframe-coding operation using reference image information last stored in a frame memory portion corresponding to the transmission side conference terminal device.

23 Claims, 17 Drawing Sheets

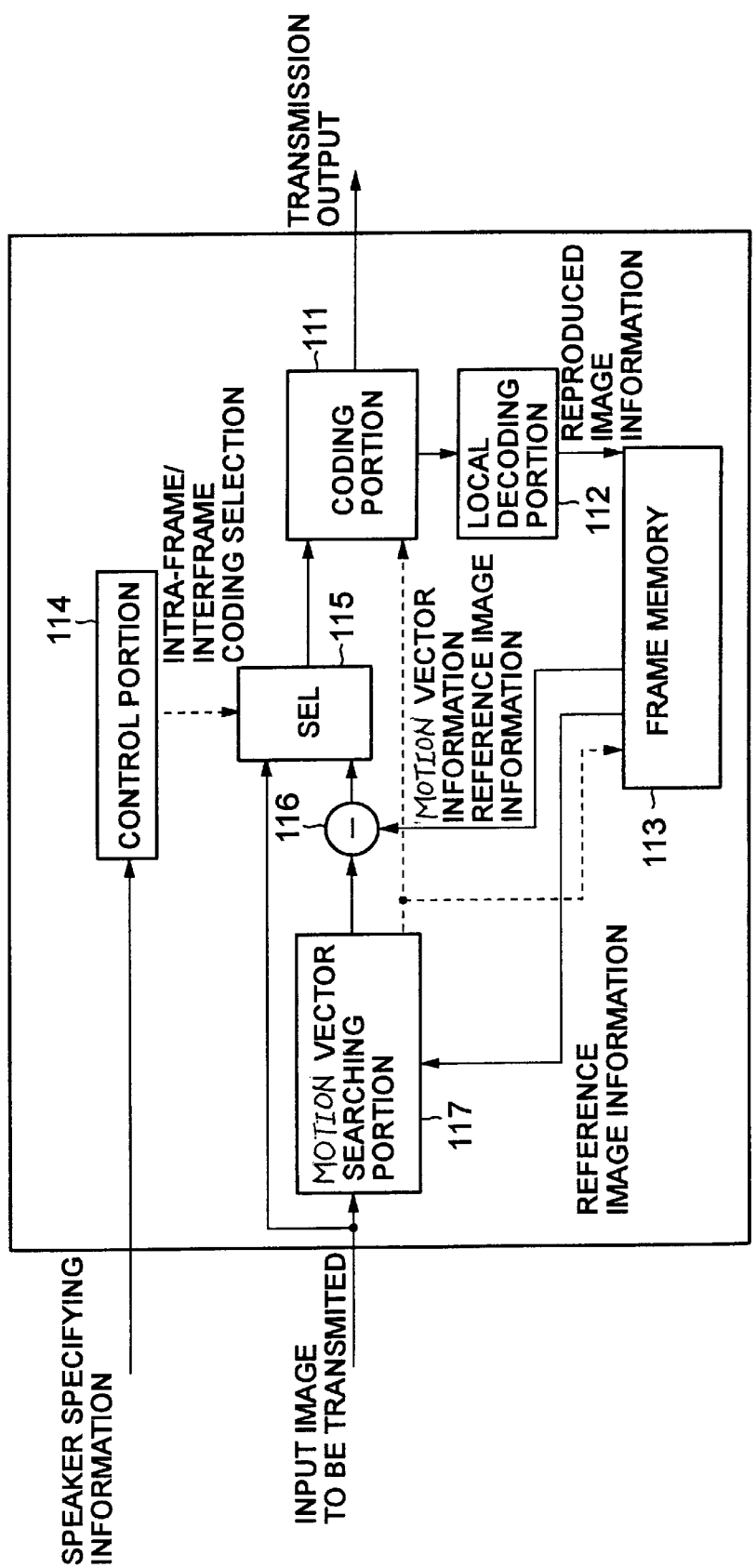

MULTI-POINT CONFERENCE SYSTEM AND CONFERENCE TERMINAL DEVICE

BACKGROUND OF THE INVENTION

1. Field of the Invention

The present invention relates to a multi-point conference system and a conference terminal device, and more particularly to a multi-point conference system in which a video conference is held using decentralized conference terminal devices and a conference terminal device used in the system.

2. Description of the Related Art

A multi-point conference system by which users who are in remote places can participate in a conference has been put to practical use. In such a multi-point conference system, conference terminal devices each of which has at least a camera device, a display device, a microphone and a loudspeaker are connected by a network such as dedicated lines, public lines or a LAN (Local Area Network). In this system, smooth image change in each of the conference terminal devices is desired.

FIGS. 1A and 1B illustrate a conventional multi-point conference system. Referring to FIGS. 1A and 1B, a multi-point control unit 100 is connected with a plurality of conference terminal devices. In this case, four conference terminal devices 101-1~101-4 are connected to the multi-point control unit 100.

Each of the conference terminal devices has a transmitting/receiving function for voice signals and image signals and a constitution of switching a coding operation between an interframe coding operation and an intra-frame coding operation. A conference terminal device at a transmitting side codes an initial frame of image data by the intra-frame coding operation and codes frames after the initial frame of the image data by the interframe coding operation. The interframe coding operation is then switched to the intra-frame coding operation at predetermined intervals (a predetermined number of frames). The intra-frame coded data and the interframe coded data are successively transmitted from the conference terminal device at the transmitting side. A conference terminal device at a receiving side decodes intra-frame coded data and stores the decoded frame data. When the next inter-frame coded data is received, the interframe coded data is decoded using the stored decoded frame data. A dynamic image is then displayed using the decoded frame data.

In addition, the multi-point control unit 100 has a function for distributing image data from each conference terminal device to other conference terminal devices. The various types of distribution of the image data have been proposed. For example, the following system has been known. In the system, one or more speakers who speaks now are selected. To a conference terminal device of a speaker, image data items of speakers other than the speaker are transmitted. To each of conference terminal devices of participants other than the speakers, image data items from the conference terminal devices of the speakers are transmitted.

Image information items 1~4 from the conference terminal devices 101-1~101-4 are transmitted to the multi-point control unit 100. When a user of the conference terminal device 101-2 speaks, the multi-point control unit 100 transmits the image information item 2 from the conference terminal device 101-2 to the other conference terminal devices 101-1, 101-3 and 101-4. When a user of the conference terminal device 101-1 speaks after the speech of the user of the conference terminal device 101-2 is terminated, the image information item 1 is transmitted from the conference terminal device 101-1 to the multi-point control unit 100. The multi-point control unit 100 then transmits the image information item from the conference terminal device 101-2 to the conference terminal device 101-1 and transmits the image information item 1 from the conference terminal device 101-1 to the other conference terminal devices 101-2, 101-3 and 101-4. This situation is shown in FIG. 1A.

When a user of the conference terminal device 101-3 speaks in this state, the multi-point control unit 100 transmits the image information item from the conference terminal device 101-1 to the conference terminal device 101-3. The multi-point control unit 100 then transmits the image information item from the conference terminal device 101-3 to the other conference terminal devices 101-1, 101-2 and 101-4. If the multi-point control unit 100 merely switches the transmission of the image information, there may be a case where the transmission of the image information is switched while the interframe coded data is being transmitted. In this case, a conference terminal device at the receiving side can not normally decode the coded imaged data until the intra-frame coded data is received.

Thus, the multi-point control unit 100 requests of a conference terminal device of a new speaker that the intra-frame coded data should be initially transmitted. The multi-point control unit 100 then supplies a display freeze instruction to stop displaying an image until intra-frame coded data is transmitted to the other conference terminal devices. This situation is shown in FIG. 1B.

For example, when the state shown in FIG. 1A is changed to a state in which the user of the conference terminal device 101-3 speaks, the multi-point control unit 100 supplies the request for the intra-frame coded data and the display freeze instruction to the conference terminal device 101-3. After the display freeze instruction, the image information 3 from the conference terminal device 101-3 is transmitted to the conference terminal device 101-1. To the conference terminal devices 101-2 and 101-4, the image information 3 substituted for the image information 1 is transmitted after the display freeze instruction.

FIG. 2 shows a coding process unit of each of the conventional conference terminal devices. Referring to FIG. 2, the coding process unit has a coding portion 111, a local decoding portion 112, a frame memory 113, a control portion 114, a selector (SEL) 115, a subtractor 116 and a motion vector search portion 117.

An image signal to be transmitted is supplied from a video camera (not shown) to the coding process unit. The image signal is then input to the motion vector searching portion 117 and the selector 115. Speaker specifying information is input to the control portion 114. The control portion 114 controls the selector 115 based on coding operation selecting information so that the coding operation is switched between the intra-fame predictive coding operation and the interframe predictive coding operation. When an image signal is selected by the selector 115, the image signal is input to the coding portion 111. The coding portion 111 codes the image signal so that the intra-frame coding operation is carried out. The difference between the input image signal and reference image information from the frame memory 113 is calculated by the subtractor 116. The subtractor 116 outputs an interframe difference signal. When the interframe difference signal is selected by the selector 115, the interframe difference signal is supplied to the coding portion 111. The coding portion 111 codes the interframe difference signal so that the interframe coding operation is carried out.

Thus, when the request for the intra-frame coded data is supplied from the multi-point control unit 100 shown in FIGS. 1A and 1B, the control portion 114 controls the selector 115 so that image information coded by the intra-frame coding operation can be transmitted. In addition, the local decoding portion 112 decodes data coded by the coding portion 111. The decoded data is stored as reproduced image information in the frame memory 113. As a result, the contents in the frame memory 113 is almost the same as the contents in the frame memory of a conference terminal device at the receiving side.

The motion vector searching portion 117 searches a predetermined area of a frame which is input at a present time using a block, having a predetermined size, indicated as the reference image information from the frame memory 113. As a result, the motion vector searching portion 117 obtains motion vector information indicating a changing direction. The motion vector information is supplied to the coding portion 111. Another process, such as a discrete cosine transform (DCT) process may be added to the coding process.

FIG. 3 shows a decoding process unit of the conventional conference terminal device. Referring to FIG. 3, the decoding process unit has a decoding portion 121, a motion compensation portion 122, a frame memory 123, an adder 124 and a selector (SEL) 125. Coded image information from a conference terminal device of a speaker is input to the decoding portion 121. The decoded image information includes control information indicating the intra-frame coded data or the interframe coded data and the motion vector information. The decoding portion 121 controls the selector 125 based on decoding operation selecting information.

In a case of the intra-frame decoding operation, the selector 125 selects image information decoded by the decoding portion 121 and the selected image information is supplied to a display device (not shown). In a case of the interframe decoding operation, predictive difference information decoded by the decoding portion 121. The predictive difference information and reference image information supplied via the motion compensation portion 122 from the frame memory 123 are added by the adder 124. As a result, reproduced image information is obtained. The reproduced image information is supplied via the selector 125 to the display device (not shown). The display device displays a dynamic image of a speaker based on the reproduced image information. The motion compensation portion 122 carries out a motion compensation process using the motion vector information. In a case where the discrete cosine transform process is carried out in the conference terminal device at the transmitting side, the inverse discrete cosine transform process is carried out in addition to the decoding process.

In the conventional multi-point conference system, the multi-point control unit 100 switches the image information transmitted therefrom and transmits the request for the intra-frame coding operation to a conference terminal device of a speaker. The coding operation is switched to the intra-frame coding operation in accordance with the request. Thus, in a conference terminal device at the receiving side, intra-frame coded data is initially received and interframe coded data after the intra-frame coded data is decoded, so that a reproduced dynamic image can be displayed using decoded frame data.

However, in the intra-frame coding operation, a relatively large amount of data is generated in comparison with the interframe coding operation. That is, a compression rate is decreased. Thus, when the network connected with the conference terminal devices has a low transmission speed, a long transmission time for image data obtained by coding the head picture in the intra-frame coding operation is required. As a result, a relatively long time is required to display a normal reproduced image. Thus, when a speaker is changed, a long time is required to change an image, corresponding to the speaker, to be displayed.

SUMMARY OF THE INVENTION

Accordingly, a general object of the present invention is to provide a novel and useful multi-point conference system in which the disadvantages of the aforementioned prior art are eliminated.

A specific object of the present invention is to provide a multi-point conference system in which a time required to change image to be displayed in each of conference terminal devices can be decreased.

The objects of the present invention are achieved by a multi-point conference system comprising: a plurality of conference terminal devices coupled to each other, image information and voice information being transmitted among the plurality of conference terminal devices so that users of the plurality of conference terminal devices are in conference with each other, wherein each of the plurality of terminal devices comprises: a coding process unit for coding image information by switching an intra-frame coding operation and an interframe coding operation and transmit coded image information when the each of the plurality of terminal devices is specified by a speaker specifying information item; a decoding process unit for decoding coded image information by a decoding operation corresponding to the coding operation performed to code the image information; and frame memory portions which are assigned to conference terminal devices joining in the conference, each of the frame memory portions storing reference image information last decoded, the reference image information being used in the decoding operation corresponding to the interframe coding operation, and wherein the coding process unit of a transmission side conference terminal device which is specified again by the speaker identifying information item codes image information by the interframe coding operation starting from a head frame, the decoding process unit of a receiving side conference terminal device which receives the coded information from the transmission side conference terminal device decodes the coded information by the decoding operation corresponding to the interframe-coding operation using reference image information last stored in a frame memory portion corresponding to the transmission side conference terminal device.

According to the present invention, when the conference terminal device is specified again, the image information is coded by the interframe coding operation from the head frame without performing the intra-frame coding operation. Thus, the image can be quickly changed.

Another object of the present invention is to provide a conference terminal device used in the above multi-point conference system.

The object of the present invention is achieved by a conference terminal device used in a multi-point conference system in which users of conference terminal devices are in a conference with each other, comprising: a coding process unit for coding image information; and a decoding process unit for decoding coded image information, wherein said coding process unit comprises: coding means for coding the image information by an intra-frame coding operation or an interframe coding operation; and a control portion for switching the intra-frame coding operation and the interframe coding operation in said coding means when said conference terminal device is specified by a speaker specifying information item and performing transmission control to transmit coded image information, and wherein said decoding process unit comprises: a plurality of frame memory portions corresponding to conference terminal devices joining in the conference; a selector for selecting a frame memory portion, corresponding to a conference terminal device from which intra-frame coded image information is received, from among said plurality of frame memory portions; a control portion for controlling said selector; and decoding means for decoding received coded image information by a decoding operation corresponding to either the intra-frame coding operation or the interframe coding operation.

According to the present invention, the decoding process unit has the plurality of frame memory portions corresponding to conference terminal devices joining in the conference. Even if the intra-frame coded image information items are simultaneously received from a plurality of the conference terminal devices, the interframe coded image information items can be decoded using reference image information items last store in the frame memory portions.

BRIEF DESCRIPTION OF THE DRAWINGS

Other objects, features an advantages of the present invention will be apparent from the following description when read in conjunction with the accompanying drawings, in which:

FIG. 2 is a block diagram illustrating a coding unit of a conference terminal device in the multi-point conference system shown in FIGS. 1A and 1B;

DESCRIPTION OF THE PREFERRED EMBODIMENTS

A description will be given of a first embodiment of the present invention.

Figure 1A:
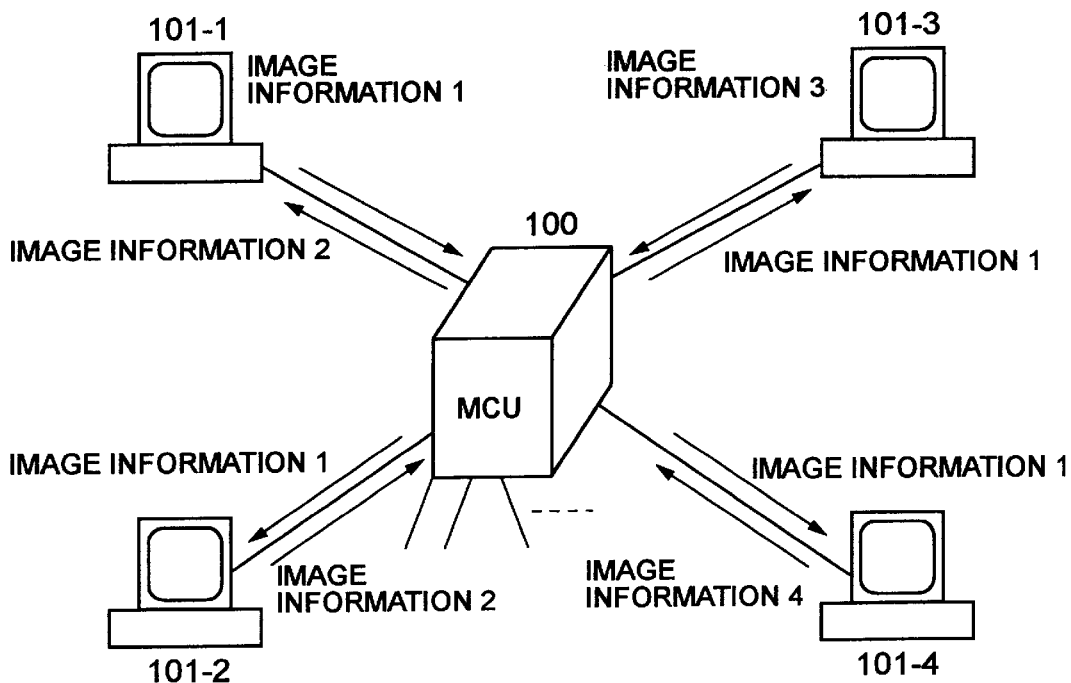
FIGS. 1A and 1B are diagrams states of a conventional multi-point conference system.
Figure 1B:
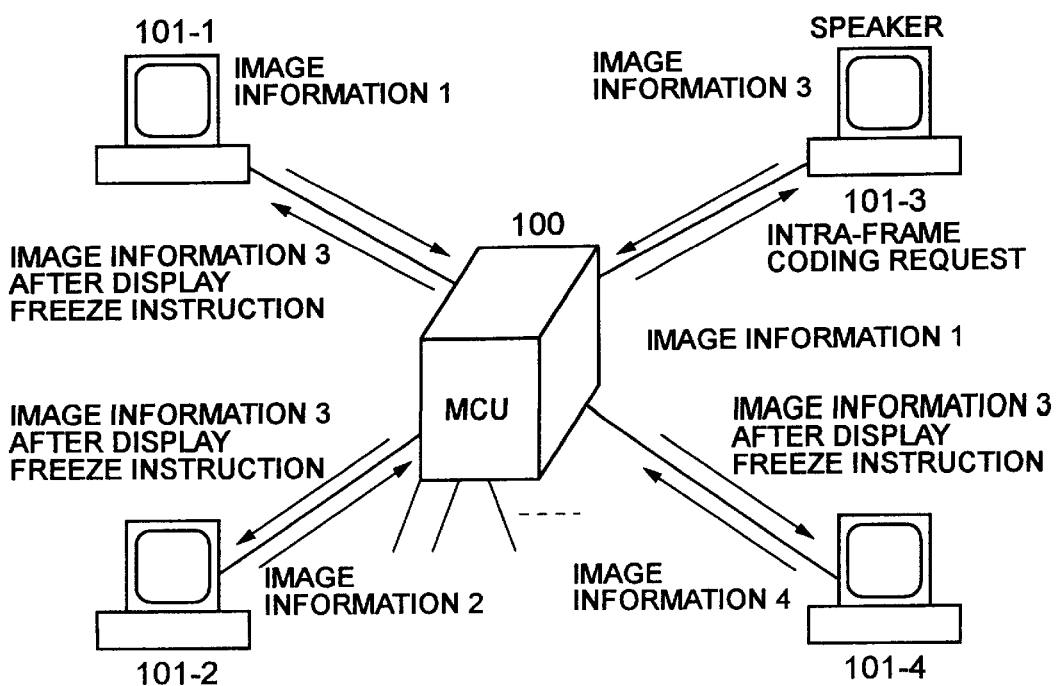
Figure 3:
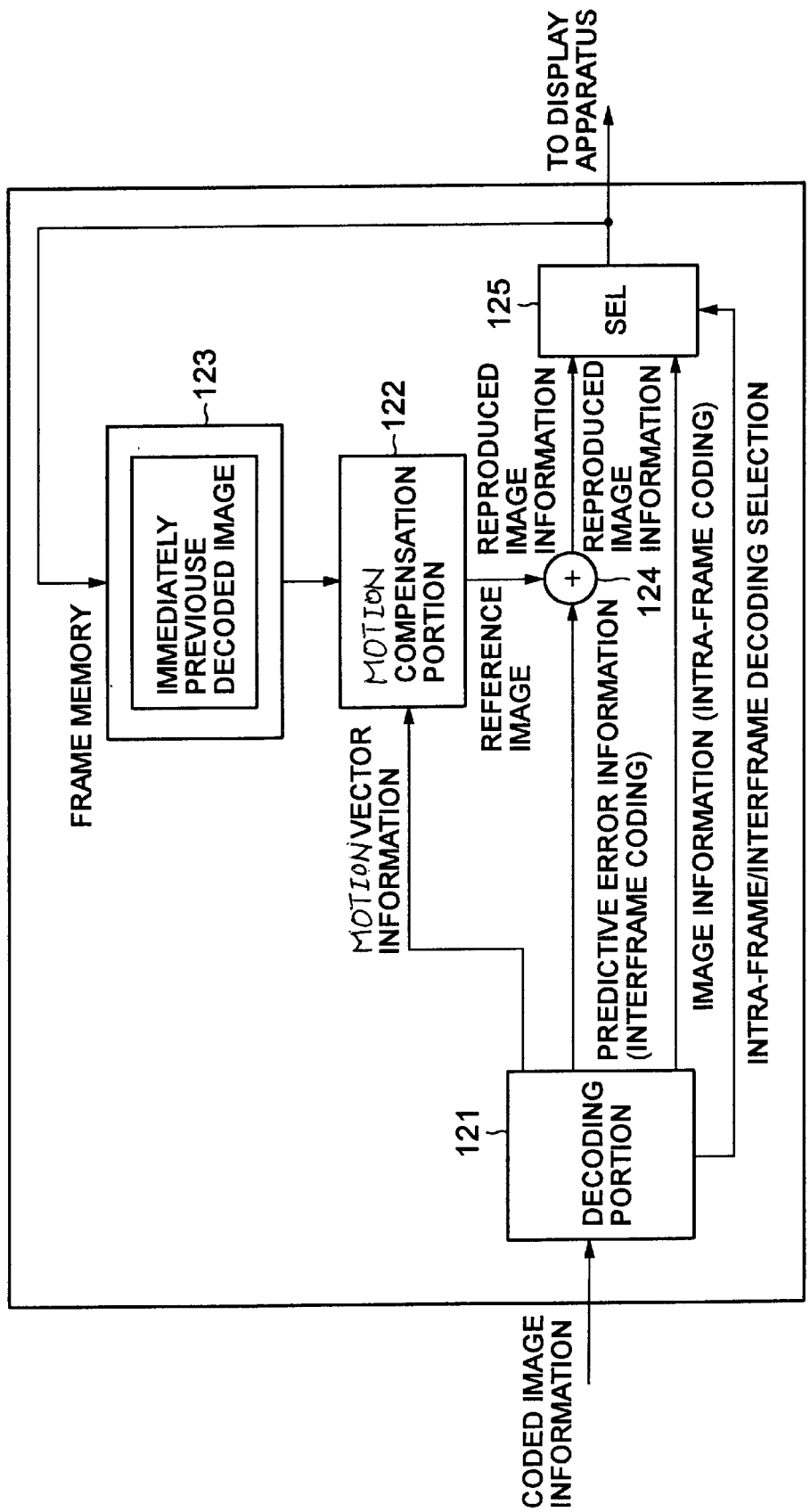
FIG. 3 is a block diagram illustrating a decoding unit of the conference terminal device in the multi-point conference system shown in FIGS. 1A and 1B.
Figure 4:
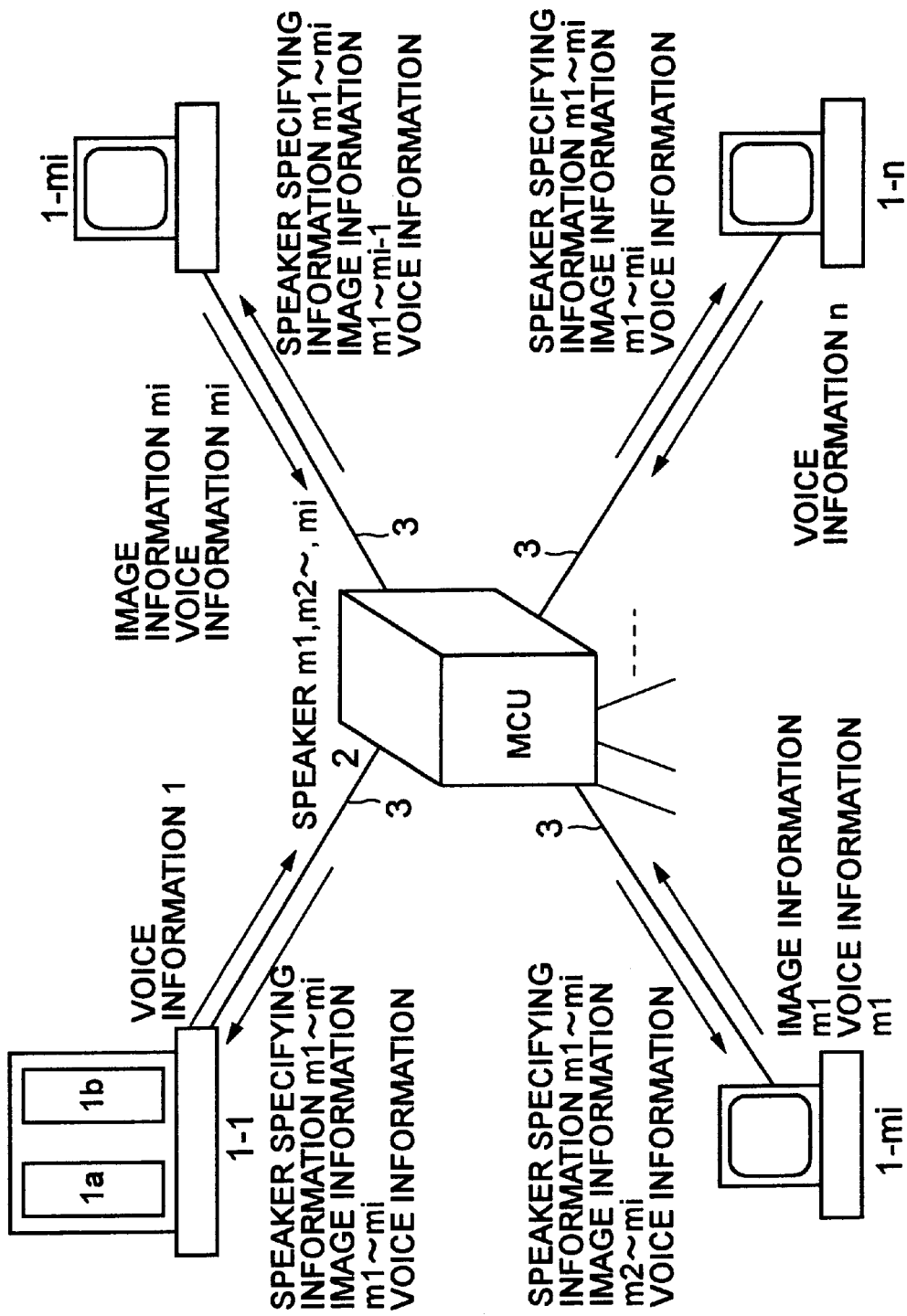
FIG. 4 is a diagram illustrating a multi-point conference system according to a first embodiment of the present invention.

A multi-point conference system according to the first embodiment of the present invention is formed as shown in FIG. 4. Referring to FIG. 4, the multi-point conference system has conference terminal devices 1-1~1-n, a multi-point control unit (MCU) 2 and lines 3, such as public lines or dedicated lines, forming a start-type network. Each of the conference terminal devices 1-1~-n has a coding process unit 1a and a decoding process unit 1b. The multi-point control unit 2 has a function of distribution of image data and a function of specifying a speaker. The conference terminal devices 1-1~1-n have the same structure. The decoding process unit 1b of each of the conference terminal devices 1-1~1-n has frame memories (frame memory areas) corresponding to other conference terminal devices. The frame memories are used to store frame data which is decoded in the decoding operation.

When there are speakers m1~mi who are users of the conference terminal devices 1-1~1-i, the multi-point control unit 2 transmits the speaker specifying information items m1~mi to the respective conference terminal units 1-1~1-n. The multi-point control unit 2 further transmits image information from a conference terminal device specified by each of the speaker specifying information items m1~mi to conference terminal devices specified by other speaker specifying information items. When a conference terminal device detects that the speaker specifying information items m1~mi includes a speaker specifying information item corresponding to the conference terminal device, the conference terminal device transmits coded image information.

For example, the conference terminal device 1-mi is specified by the speaker specifying information item mi, so that the conference terminal device 1-mi transmits the image information item m1 and speech information item m1 to the multi-point control unit 2. At this time, the multi-point control unit 2 transmits the image information items m2~mi and the speech information items to the conference terminal device 1-mi. A speaker specifying information item specifying the conference terminal device 1-1 is not included in the speaker specifying information items m1~mi, so that the conference terminal device 1-1 transmits only a speech information item 1 to the multi-point control unit 2. The conference terminal device 1-1 receives the image information items m1~mi and the speech information items and can reproduce the images and speeches.

In this case, the intra-frame coding operation is initially performed and the interframe coding operation is performed after the intra-frame coding operation is completed. When a speaker specifying information item specifying a conference terminal device is included in the received speaker specifying information items, the contents of the frame memory of the coding process unit 1a are maintained. After this, when it is detected again that the speaker specifying information item specifying the conference terminal device is included in the received speaker specifying information items, the interframe coding operation is performed based on the contents of the frame memory. The interframe coded image data is then transmitted.

In the multi-point conference system, a background image of each speaker is not changed during the conference. In addition, a speaker may not greatly move during the conference. Thus, even if a certain time elapses, the image of the speaker and the background image thereof can be coded by the interframe coding operation using the contents previously stored in the fame memory. As a result, the amount of data processed in the conference terminal device can be greatly decreased in comparison with the case of the intra-frame coding operation.

The decoding process unit 1b of each of the conference terminals 1-1~1-n has the frame memories corresponding to the speakers (the conference terminal devices). Frame memories are selected based on the speaker specifying information items. The contents of a frame memory corresponding to a speaker specifying information item which is not included in the received speaker specifying information items are maintained. After this, if it is detected that the speaker specifying information item is included in the received speaker specifying information items, coded image information which is received together with the speaker specifying information items is decoded by the interframe decoding operation using the information in the frame memory corresponding to the speaker specifying information item.

That is, when the speaker is changed, the multi-point control unit 2 distributes the image information items and transmits the speaker specifying information items. When each of the conference terminal device 1-1~1-n receives a speaker specifying item corresponding to the conference terminal device, image information immediately obtained by the interframe coding operation using the previous contents of the frame memory is transmitted from each of the conference terminal devices 1-1~1-n. A conference terminal device at the receiving side selects a frame memory based on the received speaker specifying information items and can immediately reproduce received image information by the interframe decoding operation. Thus, the switching of the image information can be quickly performed.

Figure 5:
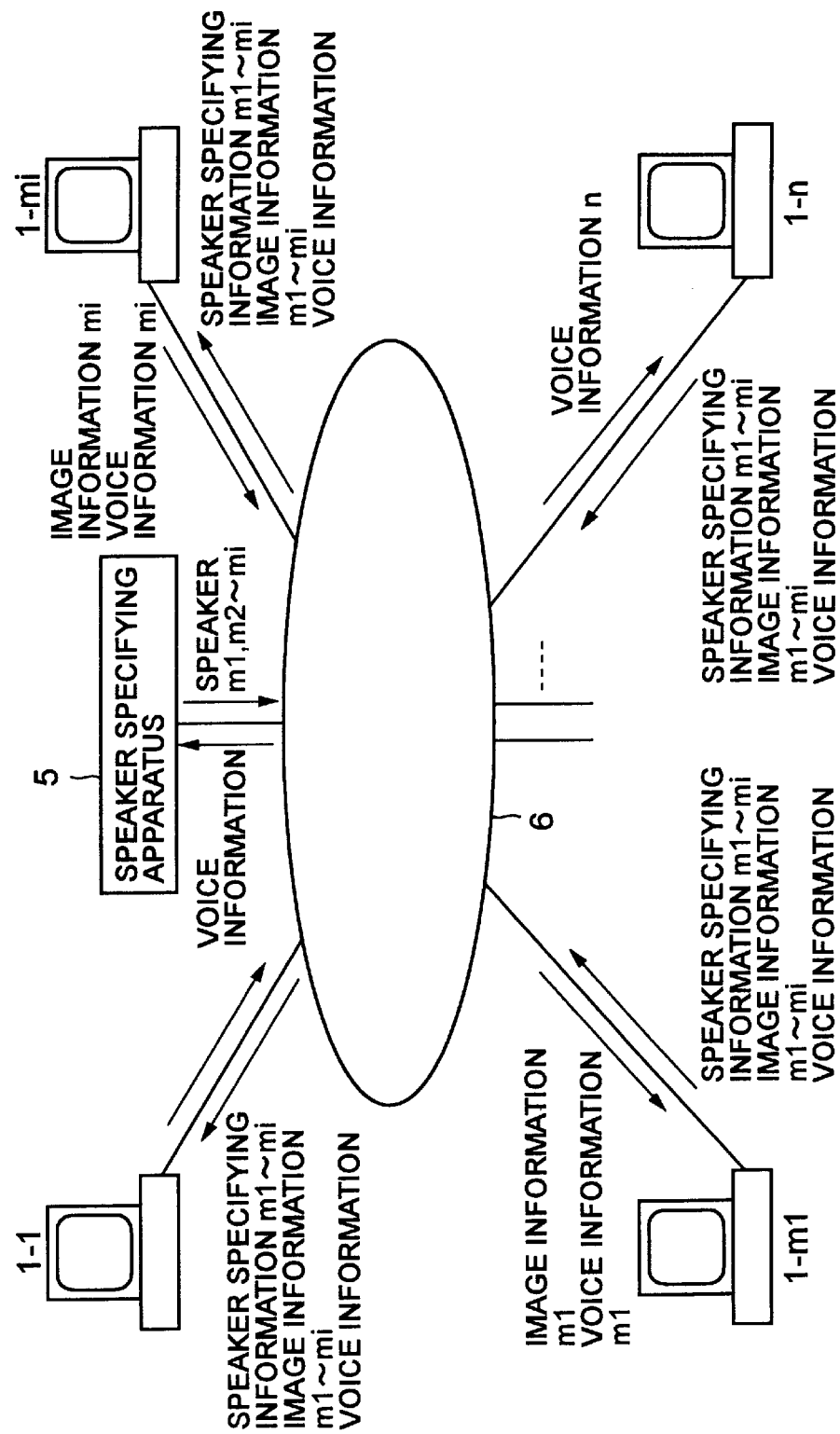
FIG. 5 is a diagram illustrating the multi-point conference system according to a second embodiment of the present invention.

The multi-point conference system according to a second embodiment of the present invention is formed as shown in FIG. 5. Referring to FIG. 5, the multi-pint conference system includes conference terminal devices 1-1~1-n and a speaker specifying apparatus 5. The conference terminal devices 1-1~1-n and the speaker specifying apparatus 5 are connected by a LAN (Local Area Network) 6 which is a bus-type network. Each of the conference terminal devices 1-1~1-n has the coding process unit 1a and the decoding process unit 1b in the same manner as that in the system shown in FIG. 4. The speaker specifying apparatus 5 transmits speaker specifying information items to the respective conference terminal devices 1-1~1-n.

In each of the conference terminal devices 1-11-n, the frame memory maintains the information obtained by the last intra/interframe coding operation. When a speaker specifying information item is received again, the interframe coding operation is immediately started without starting the intra-frame coding operation. In addition, frame memories corresponding to speakers are provided in the decoding process unit 1b of each of the conference terminal devices 1-1~1-n. Thus, when a speaker specifying information item is received again, the interframe coded data can be decoded using the information in the frame memory corresponding to a speaker specified by the received speaker specifying information item.

An image information item is transmitted from a conference terminal device which is specified by one of speaker specifying information items to the LAN 6. For example, a conference terminal device 1-m1 which receives speaker specifying information items m1~mi transmits, as shown in FIG. 5, an image information item m1 and a voice information item m1 and can receive and reproduce image information items m1~mi in the LAN 6. In this case, image information items m2~mi from the other conference terminal devices 1-m2~1-mi can be received and reproduced in the conference terminal unit 1-mi. In addition, a conference terminal device 1-1 which is not specified by one of the speaker specifying information items m1~mi transmits only a voice information item 1 and receives and reproduces the image information items m1~mi and the voice information items in the LAN 6.

One of the conference terminal devices 1-1~1-n may be substituted for the speaker specifying apparatus 5 so as to be a maser which functions as the speaker specifying apparatus 5. When the conference terminal device which is the master breaks down or gets away from the conference, another one of the conference terminal devices may be changed to the master.

Figure 6:
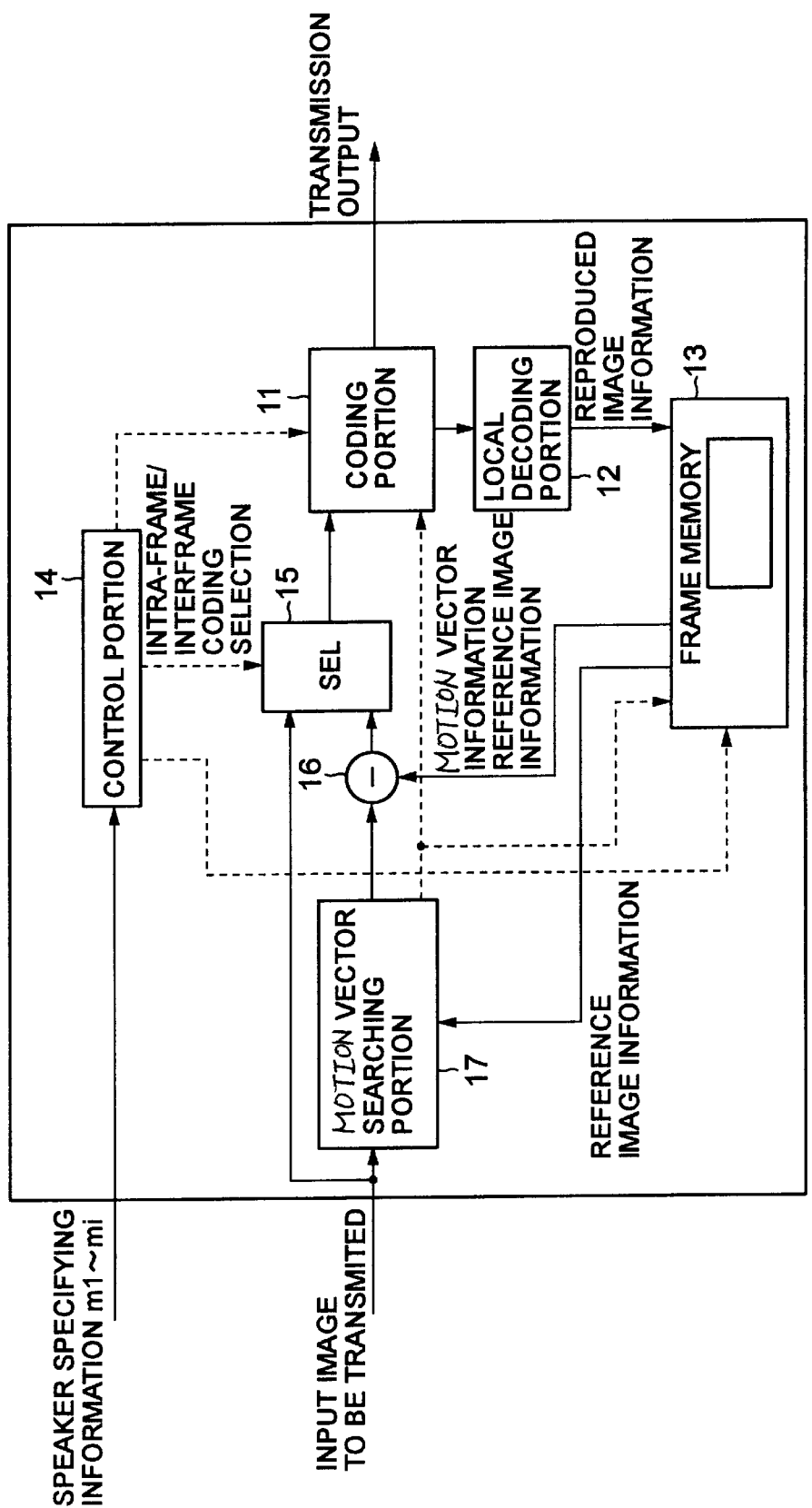
FIG. 6 is a block diagram illustrating a coding process unit of a conference terminal device according to a third embodiment of the present invention.

The coding process unit of the conference terminal device according to a third embodiment of the present invention is formed as shown in FIG. 6. The coding process unit has a coding portion 11, a local decoding portion 12, a frame memory 13, a control portion 14, a selector (SEL) 15, a subtractor 16 and a motion vector searching portion 17.

The coding portion 11, the local decoding portion 13, the selector 15, the subtractor 16 and the motion vector searching portion 17 function in the same manner as those shown in FIG. 2. The control portion 14 of the present embodiment receives, for example, the speaker specifying information items m1~mi from the multi-point control unit 2 shown in FIG. 4 or the speaker specifying apparatus 5 shown in FIG. 5. The control portion 14 then determines whether the conference terminal device is specified. If the conference terminal device is specified, it is further determined whether this is the first time that the conference terminal device is specified. If this is the first time that the conference terminal device is specified, the control portion 14 controls the coding portion 11 and the selector 15 so that a head frame of the image information to be transmitted is input to the coding portion 11 via the selector 15. As a result, the head frame is coded by the intra-frame coding operation.

The intra-frame coded image information is decoded by the local decoding portion 12 so that reproduced image information is obtained. The reproduced image information is stored in the frame memory 13. From the next frame, the selector 15 is controlled in accordance with the intra-frame/interframe predictive coding selection specifying information. The selector 15 is switched so that an output signal from the subtractor 15 is input to the coding portion 11. Frames are coded by the interframe coding operation using the difference between the contents of the frame memory 13 and image information supplied via the motion vector searching portion 17 as the image information to be transmitted.

When a speaker specifying information item corresponding to the conference terminal device is not included in the received speaker specifying information items, the control portion 14 stops the coding operation in the coding portion 14. The contents of the frame memory 13 is then maintained. When the conference terminal device is specified by a speaker specifying information item again, the control portion 14 causes the coding portion 11 to start the coding operation and controls the selector 15 so that the interframe coding operation is performed using the contents of the frame memory 13. That is, when the conference terminal device is specified by the speaker specifying information item again, the interframe coding operation is performed starting from the head frame without the intra-frame coding operation. The control portion 14, for example, controls the transmission portion (not shown) so that the coded image information is transmitted when the conference terminal device is specified by the speaker specifying information item. On the other hand, when the conference terminal device is not specified by the speaker specifying information, the control portion 14 inhibits the transmission portion from transmitting the coded image information.

Figure 7:
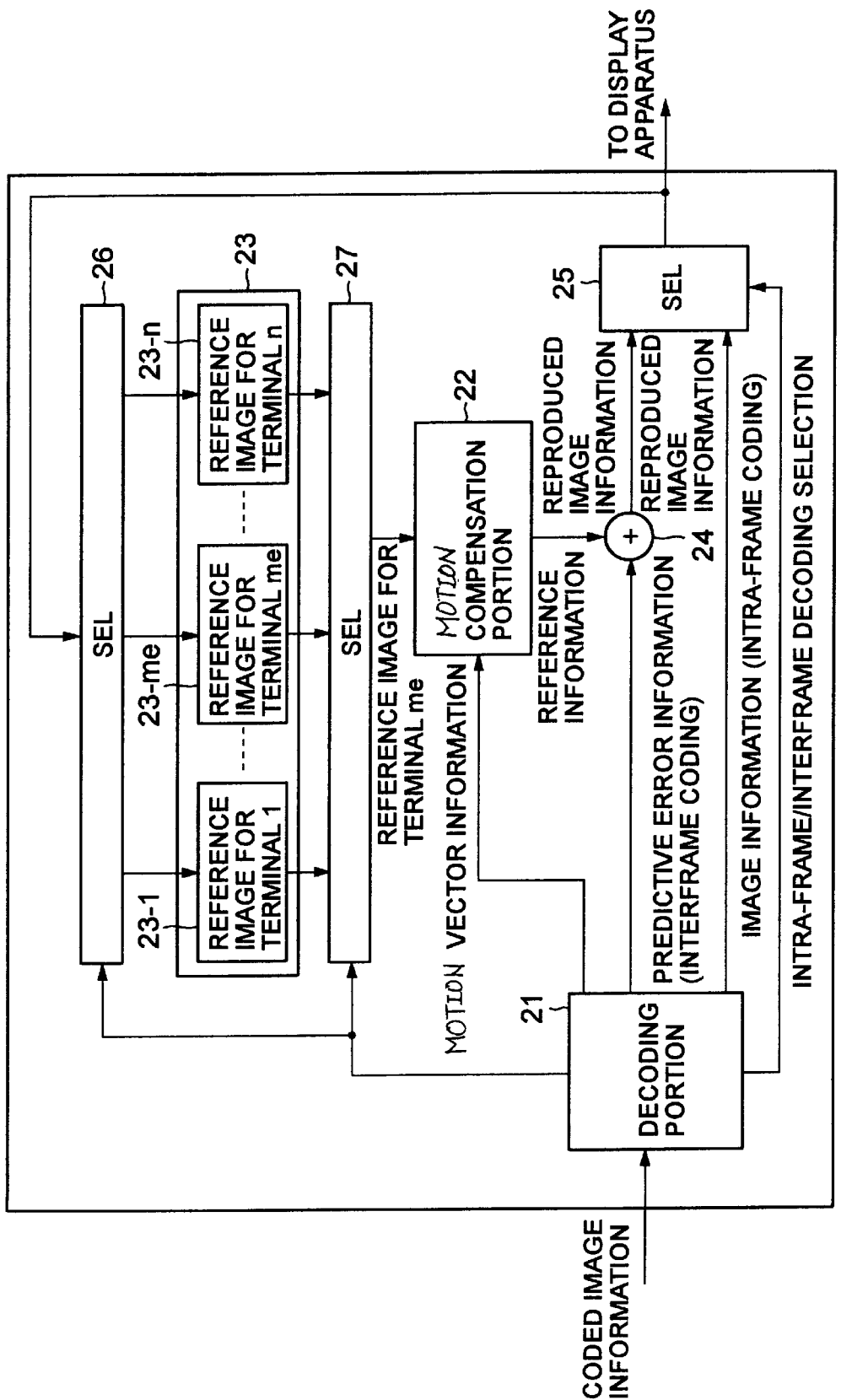
FIG. 7 is a block diagram illustrating a decoding process unit of the conference terminal device according to the third embodiment of the present invention.

The decoding process unit of the conference terminal device according to the third embodiment of the present invention is formed as shown in FIG. 7. Referring to FIG. 7, the decoding process unit has a decoding portion 21, a motion compensation portion 22, a frame memory 23 including memory portions 23-1~23-n corresponding to the terminal devices, an adder 24 and selectors (SEL) 25~27.

The decoding process unit has the same structure part as that shown in FIG. 2. The description of the same structure part is omitted. In the present embodiment, the frame memory 23 has the memory portions 23-1~23-n corresponding to the conference terminal devices. That is, a plurality of frame memories are provided. The decoding portion 21 controls the selectors 26 and 27 so that a memory portion corresponding to a conference terminal unit specified by a conference terminal information added to a speaker specifying information item or received image information is selected. For example, when a conference terminal device 1-me is specified by a speaker specifying information item me, the selectors 26 and 27 is controlled so that a memory portion 23-me is used as the frame memory. Thus, reproduced image information for one frame is stored in the memory portion 23-me as reference image information for the conference terminal device 1-me. When input of coded image information is stopped, the reproduced image information is maintained in the memory portion 23-me as the reference image information.

When a speaker specifying information item for the conference terminal device 1-me is not included in the received speaker specifying information items and a conference terminal device 1-1 is specified by a speaker specifying information item, the selectors 26 and 27 are controlled so that a memory portion 23-1 is used as the frame memory. In this case, the contents of the memory portion 23-me corresponding to the previous speaker is maintained as the reference image information in the memory portion 23-me as described above.

When the conference terminal device 1-me is specified by the speaker specifying information item again, the memory portion 23-me is selected by operations of the selectors 26 and 27. The interframe coded image information from the conference terminal device 1-me is decoded using the reference image information stored in the memory portion 23-me for the conference terminal device 1-me. The decoded image information is supplied to the display device. In this case, also reference information for the conference terminal device 1-1 corresponding to the previous speaker is maintained in the memory portion 23-1.

Figure 8:
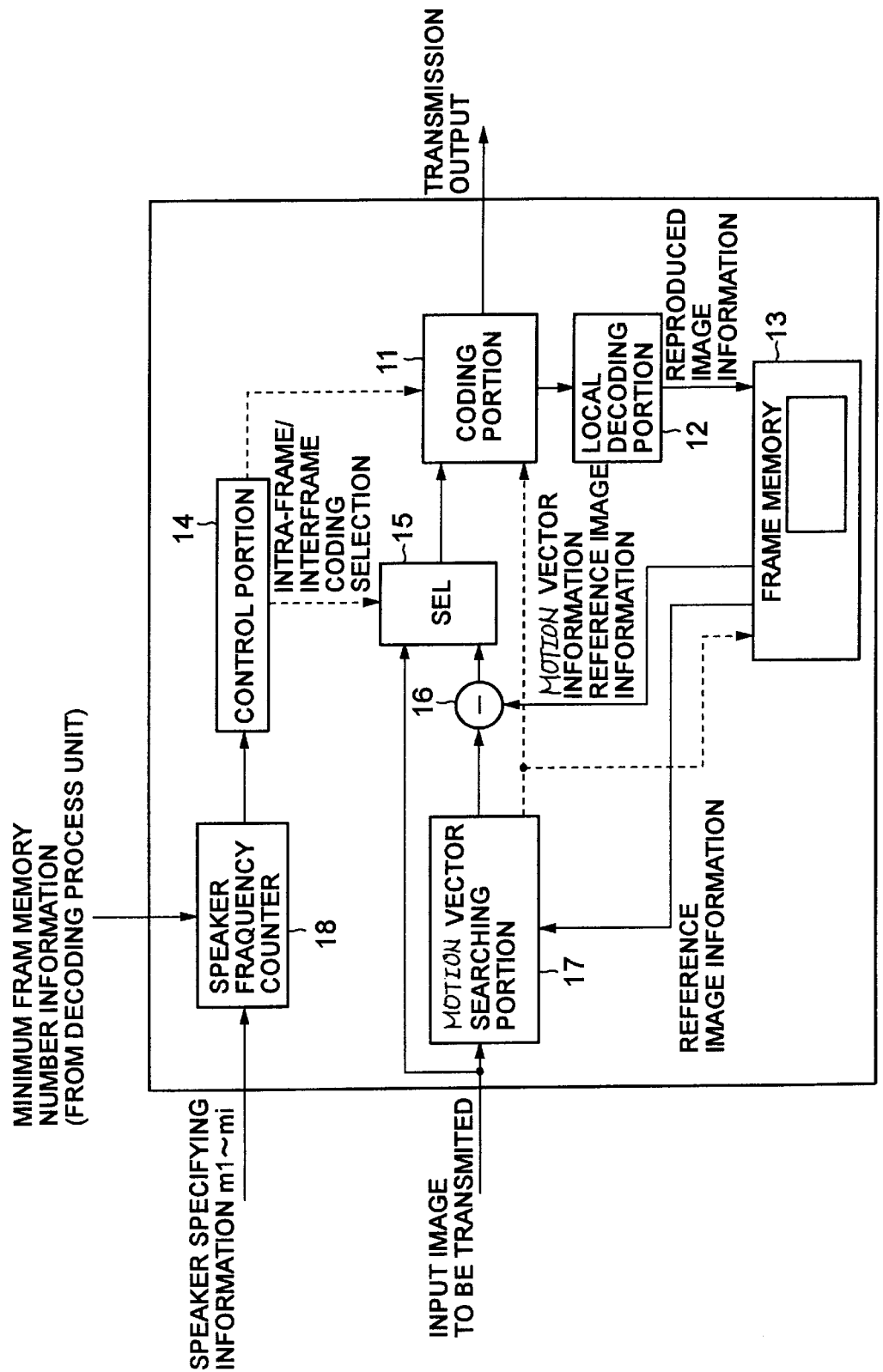
FIG. 8 is a block diagram illustrating a coding process unit of the conference terminal device according to a fourth embodiment of the present invention.
Figure 9:
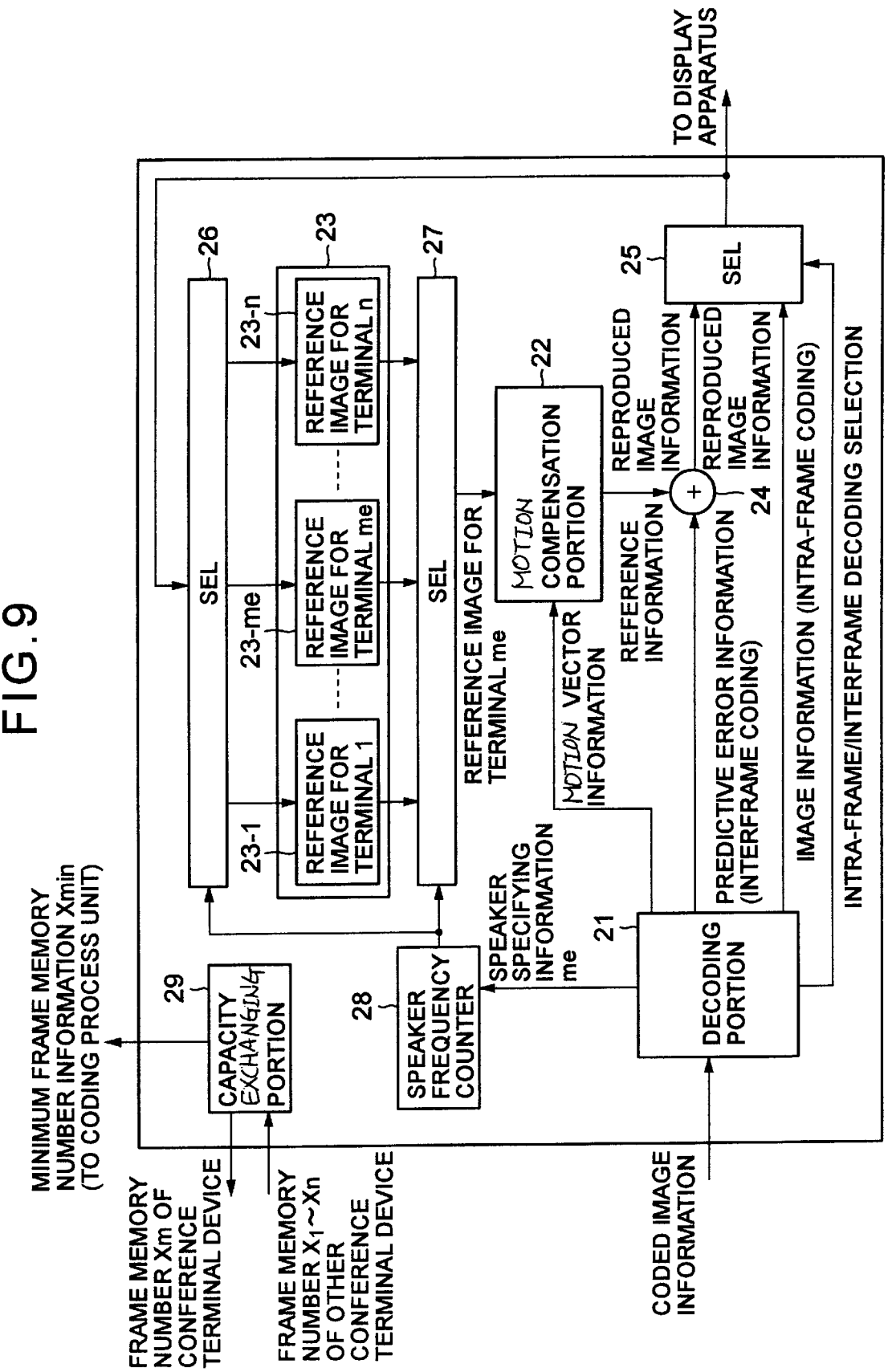
FIG. 9 is a block diagram illustrating a decoding process unit of the conference terminal device according to the fourth embodiment of the present invention.

The coding process unit of the conference terminal device according to the fourth embodiment of the present invention is formed as shown in FIG. 8. In FIG. 8, those parts which are the same as those shown in FIG. 6 are given the same reference numbers. The coding process unit further has a speaker frequency counter 18. The decoding process unit of the conference terminal device according to the fourth embodiment of the present invention is formed as shown in FIG. 9. In FIG. 9, those parts which are the same as those shown in FIG. 7 are given the same reference numbers. The decoding process unit further has a speaker frequency counter 28 and a capacity exchanging portion 29.

In the present embodiment, in a case where the number of memory portions 23-1~23-n included in the frame memory 23 is less than the number of conference terminal devices activated in the conference or a case where the transmission capacity is limited by a communication band width for the multi-point conference system, the number of memory portions which can be used is set.

When the multi-point conference is started, the capacity exchanging portion 29 of the decoding process unit transmits the number Xm of memory portions 23-1~23-n included in the frame memory 23 of the conference terminal device to other conference terminal devices. The capacity exchanging portion 29 receives the numbers X1~Xn of memory portions included in the frame memories of the other conference terminal devices. The capacity exchanging portion 29 then obtains the minimum number Xmin of memory portions and transmits the minimum number Xmin to the coding process unit.

In the coding process unit (see FIG. 8), the frequency at which each of the users participated in the conference as a speaker in a constant period is calculated based on the speaker specifying information items m1~mi. The frequency of speeches in each of the conference terminal devices is ranked. For example, the highest rank is represented by "1" and the rank is lowered in the order of "2", "3" . . . . When the speaker is changed and the conference terminal device is specified, the control portion 14 determines whether the value of the speech frequency rank (the rank of the frequency of speeches) for the conference terminal device is less than the minimum number Xmin. Based on the determination result, it is decided whether the intra-frame coding operation or the interframe coding operation should be carried out.

For example, if a user of a conference terminal device repeatedly speaks and the value of the speech frequency rank is less than the minimum number Xmin (a higher rank), it may be supposed that the last reference image information has been maintained in a memory portion, corresponding to the conference terminal device, of the frame memory in the decoding process unit of each of all the conference terminal devices. The control portion 14 thus carries out the control for transmitting interframe coded image information. On the other hand, if the value of the speech frequency rank for a conference terminal device becomes greater than the minimum number Xmin (a lower rank) at least once, the image information from the conference terminal device may not be maintained in a memory portion, corresponding to the conference terminal device, of the frame memory. In this case, the head frame is coded by the intra-frame coding operation and then transmitted.

In addition, in the decoding process unit, the speaker frequency counter 28 counts the speaker specifying information item me added to the coded image information. The speech frequency rank is then calculated based on the count value. If there is a memory portion, corresponding to the speaker specifying information item me, which was used in the last operation, the memory portion is selected by the selectors 26 and 27 so that the interframe coded image information is immediately decoded.

When the speech frequency rank depending on the count value of the speaker frequency counter 28 is less than the minimum number Xmin (the lower rank), it may be determined that the contents of a memory portion corresponding to the conference terminal device. When a user speaks in a conference terminal device having the next speech frequency rank, the memory portion is assigned to the conference terminal device having the next speech frequency rank. Thus, even if the number of memory portions of the frame memory is less than the participants, since the number of speakers having a relatively large amount of the frequency of speeches may be limited, the memory portions of the frame can be sufficiently used for the participants. The number Xmin may be decided based on the characteristic (the communication bandwidth) of the network instead of the minimum number of memory portions of the frame memory. In this case, based on the number Xmin, each of memory portions of the frame memory is assigned to a conference terminal device and the intra-frame predictive coding operation and the interframe predictive coding operation are switched.

Figure 10:
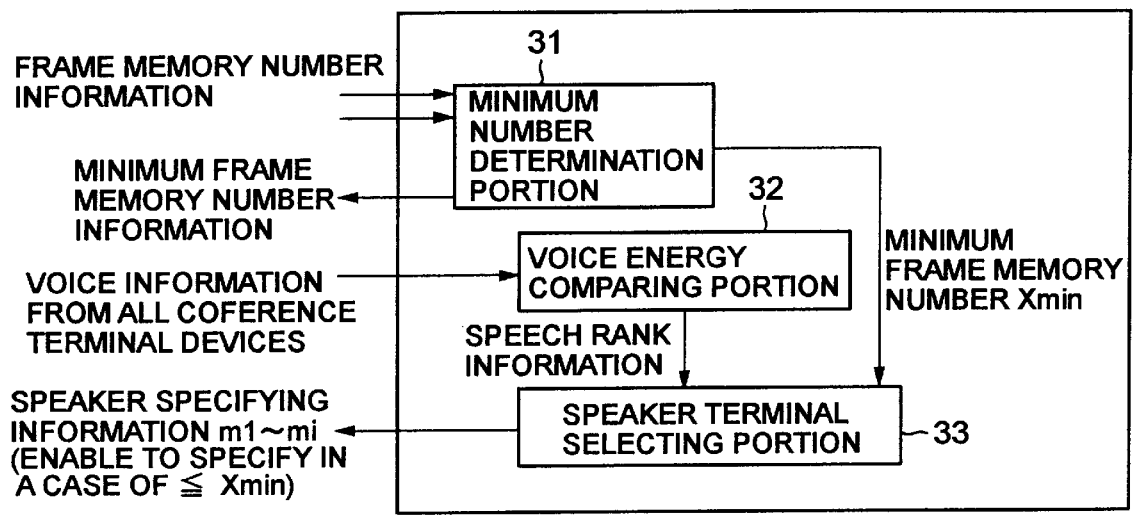
FIG. 10 is a block diagram illustrating a speaker specifying device in the multi-point conference system according to a fifth embodiment of the present invention.

The speaker specifying apparatus in the multi-point conference system according to a fifth embodiment of the present invention is formed as shown in FIG. 10. The speaker specifying apparatus has the function for transmitting the speaker specifying information in the multi-point control unit 2 shown in FIG. 4 or the function of the speaker specifying apparatus 5 shown in FIG. 5. Referring to FIG. 10, the speaker specifying apparatus has a minimum number determination portion 31, a voice energy comparing portion 32 and a speaker terminal selecting portion 33.

The minimum number determination portion 31 collects the number of memory portions of the frame memory from each of the conference terminal devices joining in the conference and detects the minimum number Xmin. The minimum number Xmin of the memory portions of the frame memory is supplied from the minimum number determination portion 31 to the speaker terminal selecting portion 33. The minimum number Xmin is also supplied to the respective conference terminal devices joining in the conference.

Figure 11:
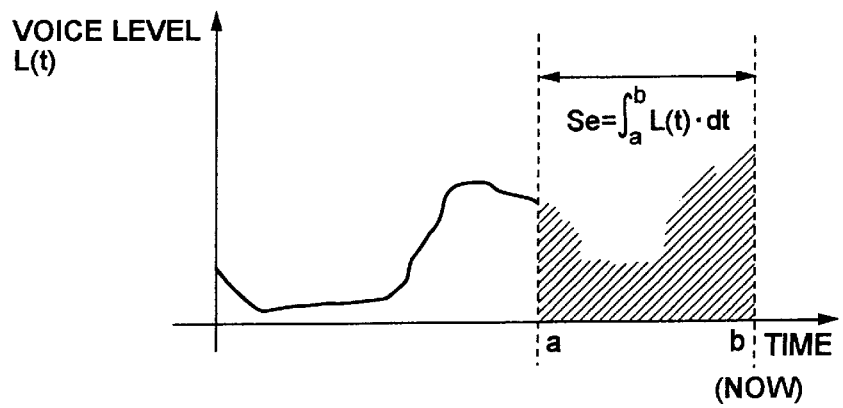
FIG. 11 is a characteristic diagram illustrating a speaker determination process.

Voice information from each of the conference terminal devices is collected by the voice energy comparing portion 32. The voice energy comparing portion 32 decides speaking rank information and transmits it to the speaker terminal selecting portion 33. The voice energy comparing portion 33 calculates voice energy Se. As shown in FIG. 11, voice levels in a period from t=a to t=b are integrated so that the voice energy Se is calculated. That is, the calculation is carried out in accordance with the following equation.

$$Se=\int_a^b L(t)dt$$

The voice energy Se is selected according to value so that the number of speakers is less than the minimum number Xmin. One or plurality of speaker specifying information items m1~mi are made based on the voice energy Se.

The speaker specifying information items m1~mi are transmitted to the conference terminal devices. In the decoding process unit shown in FIG. 7, the selectors 26 and 27 are controlled based on the conference terminal information added to the received coded image information so that the decoding operation is carried out using the contents of the memory portions 23-m1~23-mi, corresponding to the speaker specifying information items m1~mi, of the frame memory 23. In addition, in the decoding process unit shown in FIG. 9, the memory portions corresponding to the conference terminal devices are selected in accordance with the speech frequency rank.

Figure 12:
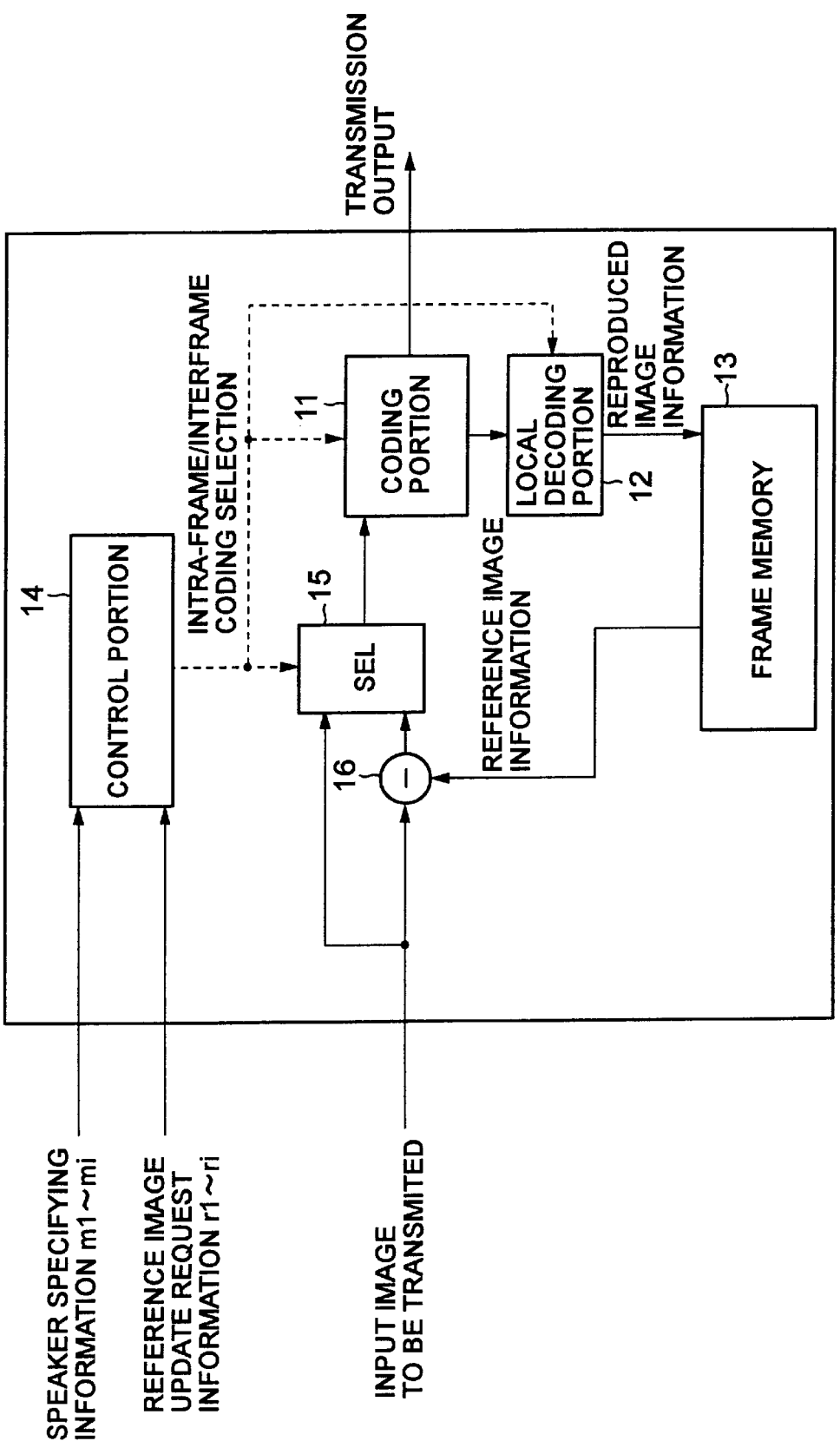
FIG. 12 is a block diagram illustrating an essential part of the coding process unit of the conference terminal device according to the third embodiment of the present invention.

An essential part of the coding process unit of the conference terminal device according to the third embodiment of the present invention is formed as shown in FIG. 12. In FIG. 12, those parts which are the same as those shown in FIG. 6 are given the same reference numbers and the motion vector searching portion shown in FIG. 6 is omitted. Referring to FIG. 12, the speaker specifying information items m1~mi and reference image update request information items rg1~ri, from the multi-point control unit 2 show in FIG. 4 or the speaker specifying apparatus 5 shown in FIG. 5, are input to the control unit 14. When the conference terminal device is specified by the speaker specifying information item included in the speaker specifying information items m1~mi and the conference terminal device is requested to update the reference image by the reference image update request information, the control unit 14 controls the respective parts so that the intra-frame coding operation is carried out for the head frame and interframe coding operation is carried out starting from the next frame.

For example, when a conference terminal device is first specified by a speaker specifying information item after the conference is started, information of the head frame is coded by the intra-frame coding operation in accordance with the speaker specifying information item and the reference image update request information item. Thus, in a conference terminal device at the receiving side, image information can be decoded from the head frame and the image can be reproduced.

When the conference terminal device is specified by a speaker specifying information item included in the speaker specifying information items m1~mi and not requested to update the reference image by the reference image update request information, that is, when the conference terminal device is specified by the speaker specifying information item after the second time, the control portion 14 controls the respective parts so that the interframe coding operation is performed using the last reference image information stored in the frame memory 13. In this case, in the conference terminal device at the receiving side, the last reference image information is maintained in a memory portion, corresponding to the conference terminal device, of the frame memory, and image information is decoded by the interframe decoding operation using the last reference image information and an image is reproduced in accordance with the decoded image information.

Figure 13:
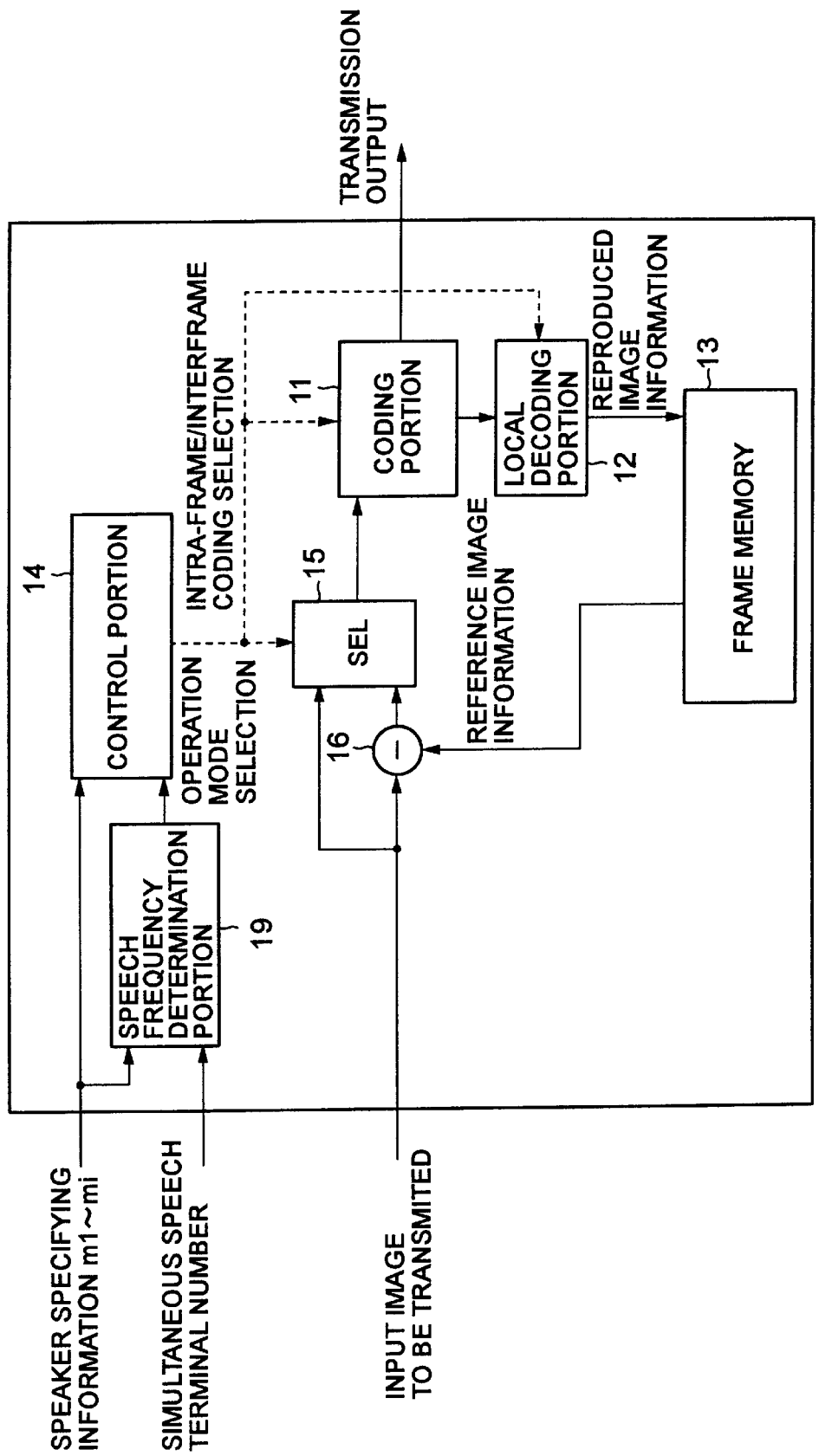
FIG. 13 is a block diagram illustrating an essential part of the coding process unit of the conference terminal device according to the fourth embodiment of the present invention.

An essential part of the coding process unit of the conference terminal device according to the fourth embodiment of the present invention is formed as shown in FIG. 13. In FIG. 13, those parts which are the same as those shown in FIG. 8 are given the same reference numbers. The motion vector searching portion shown in FIG. 8 is omitted. Referring to FIG. 13, the coding process unit further has a speech frequency determination portion 19. The speech frequency determination portion 19 corresponds to the speaker frequency counter shown in FIG. 8. The speech frequency determination portion 19 receives the speaker specifying information items m1~mi and the simultaneous speech terminal number Xmin. The simultaneous speech terminal number Xmin is the number of conference terminal devices in which users (participants) can simultaneously speak. The speech frequency determination portion 19 counts the speaker specifying information items m1~mi for each of the speakers and determines the speech frequency rank for the conference terminal device. When the conference terminal device is specified by the speaker specifying information item, the speech frequency determination portion 19 compares the speech frequency rank with the simultaneous speech terminal number Xmin. The comparison result is supplied to the control portion 14 as operation mode selecting information. The minimum number Xmin described above with reference to FIGS. 8 and 9 or the number based on the transmission speed (the communication bandwidth) of the network may be used as the simultaneous speech terminal number Xmin.

The operation mode selecting information indicates that the intra-frame coding operation should be selected when the value of the rank of the frequency of speeches in a past predetermined period has exceeded the simultaneous speech terminal number Xmin at least once (the rank of frequency of speeches are lowered). In addition, the operation mode selecting information indicates that the interfrme coding operation should be selected when the value of the speech frequency rank has not yet exceeded the simultaneous speech terminal number Xmin (the speech frequency rank is maintained at a high rank). The control portion 14 controls the respective portions based on the operation mode selecting information supplied from the speech frequency determination portion 19 of the conference terminal device specified by the speak specifying information item.

Thus, if the speech frequency rank for the conference terminal device is maintained at a high rank, since image information from the conference terminal device is stored as the reference image information in the frame memory of a conference terminal device at the receiving side, the conference terminal device transmits coded image information obtained by the interframe coding operation. In the conference terminal device at the receiving side, the received image information is decoded by the interframe decoding operation and an image corresponding to the decoded image information is reproduced and displayed.

Figure 14:
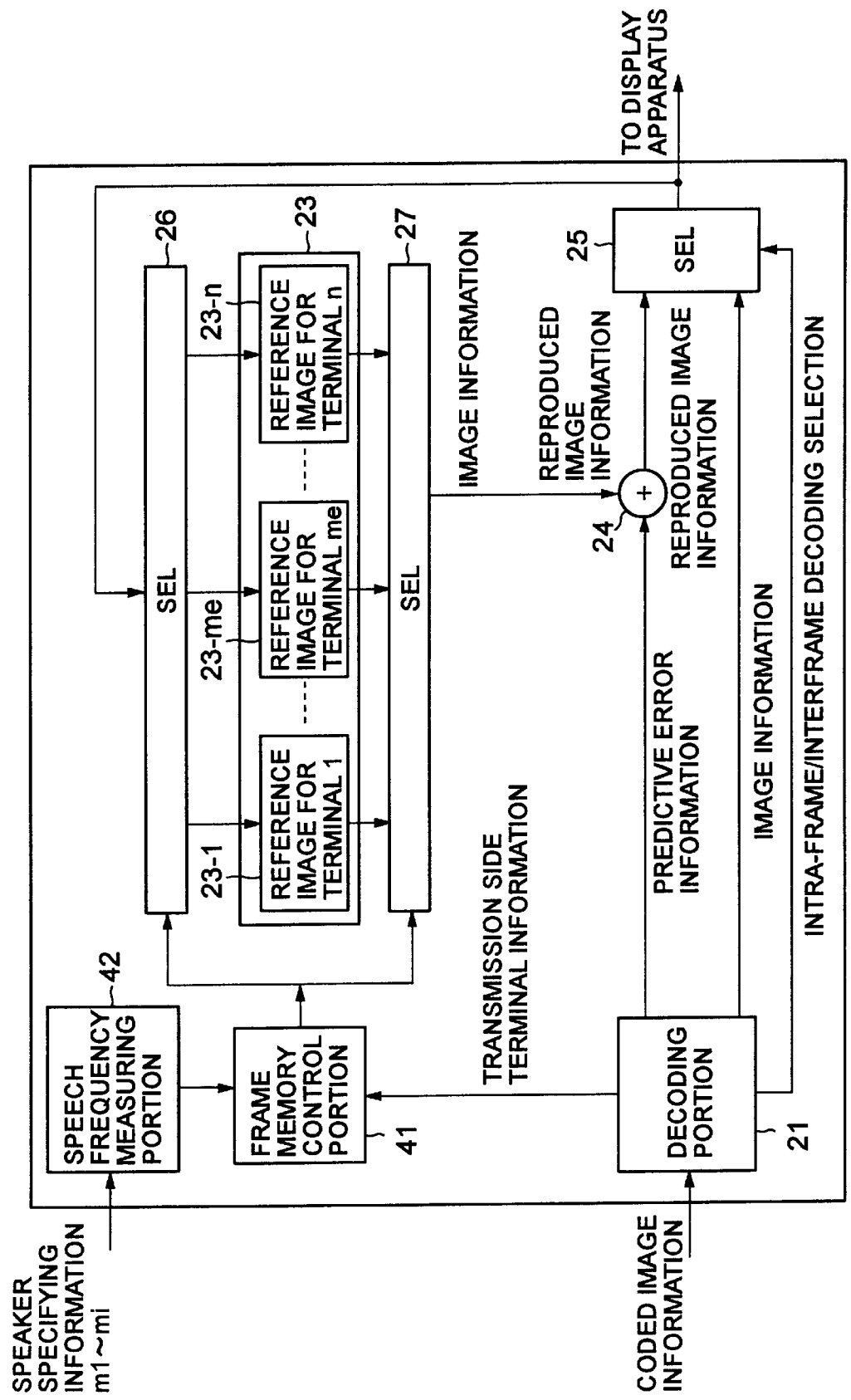
FIG. 14 is a block diagram illustrating an essential part of the decoding process unit of the conference terminal device according to the fourth embodiment of the present invention.

An essential part of the decoding process unit of the conference terminal device according to the fourth embodiment of the present invention is formed as shown in FIG. 14. In FIG. 14, those parts which are the same as those shown in FIG. 9 are given the same reference numbers. Referring to FIG. 14, the decoding process unit further has a frame memory control portion 41 and a speech frequency measuring portion 42. The motion compensation portion shown in FIG. 9 is omitted. The motion vector searching portion in the coding process unit and the motion compensation portion are paired.

Coded image information from another conference terminal device (a transmission terminal) is input to the decoding portion 21. The decoding portion 21 extracts transmission terminal information. The transmission terminal information is input to the frame memory control portion 41. The frame memory control portion 41 controls the selectors 26 and 27 in accordance with the transmission terminal information so that a memory portion corresponding to the transmission terminal is selected from among the memory portions 23-1~23-n. The selector 25 is controlled in accordance with the intra-frame/interframe coding selection information information so that the intra-frame coding operation and the interframe coding operation are switched.

The speaker specifying information items m1~mi are input to the speech frequency measuring portion 42. The speech frequency measuring portion 42 counts the speaker specifying information items for each speaker so that the speech frequency rank is decided in the order of number of times that each user behaved as the speaker in the conference in a past predetermined period. The speech frequency rank for the conference terminal device is supplied to the frame memory control portion 41. The speech frequency measuring portion 42 totals the speakers (the conference terminal devices). If the total number of speakers exceeds the number of memory portions 23-1~23-n of the frame memory 23, the speech frequency measuring portion 42 informs the fame memory control portion 41.

If it is then determined, based on the speaker specifying information items, that the speakers have been changed or the number of speakers has been increased, the frame memory control portion 41 assigns, based on the transmission terminal information extracted by the decoding portion 21, a memory portion corresponding to a conference terminal device having a lower speech frequency rank to a conference terminal device having a higher speech frequency rank. Thus, when a user of the conference terminal device having the higher speech frequency rank speaks again, image information coded by the interframe coding operation can be transmitted. On the other hand, when a user of a conference terminal device in which the speech frequency rank has been a lower rank at least once speaks again, since the frame memory 23 of the decoding process unit in a conference terminal device at the receiving side does not store the last reference image information, image information of the head frame is coded by the intra-frame coding operation.

Figure 15:
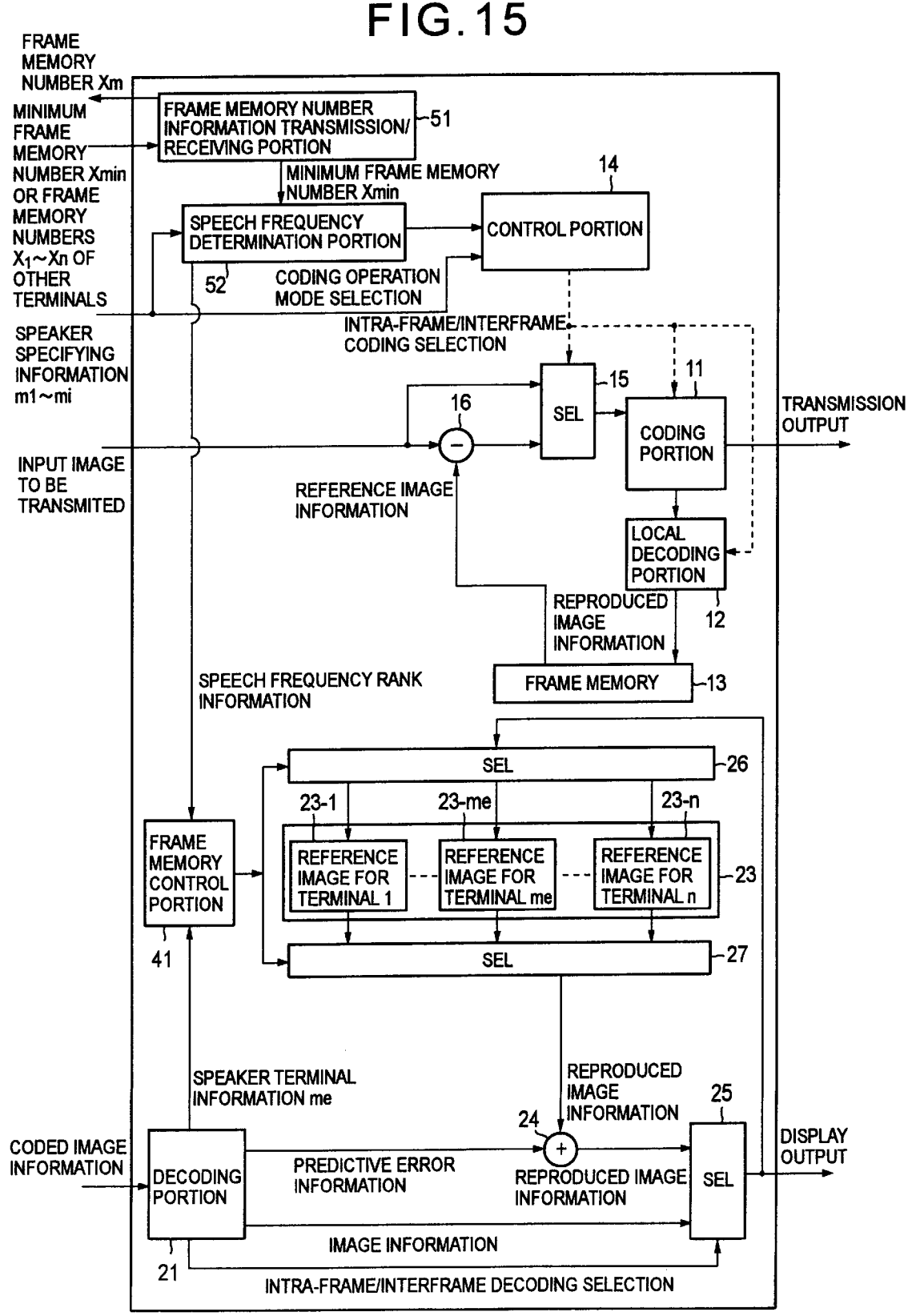
FIG. 15 is a block diagram illustrating the conference terminal device according to a sixth embodiment of the present invention.

The conference terminal device according to a sixthe embodiment of the present invention is formed as shown in FIG. 15. In FIG. 15, those parts which are the same as those shown in FIGS. 13 and 14 are given the same reference numbers. Referring to FIG. 15, the conference terminal device further includes a frame memory number information transmission/receiving portion 51 and a speech frequency rank determination portion 52. The frame memory number information transmission/receiving portion 51 transmits the number Xm of memory portions 23-1~23-n of the frame memory 24 of the conference terminal device to other conference terminal devices or the multi-point control unit 2 shown in FIG. 4.

The frame memory number information transmission/receiving portion 51 receives the minimum number Xmin of memory portions collected by the multi-point control unit 2 from the conference terminal devices joining in to the conference or the numbers Xg1~Xn of memory portions from the conference terminal devices joining in the conference. In a case where the numbers Xg1~Xn of memory portions from the other conference terminal devices joining in the conference are received, the minimum number Xmin of memory portions is calculated based on the number of memory portions of the conference terminal device and the numbers X1~Xn of memory portions of the other conference terminal devices.

The minimum number Xmin of memory portions of the frame memory is supplied to the speech frequency rank determination portion 52. The speech frequency rank determination portion 52 counts the number of speeches for each speaker in a past predetermined period based on the speaker specifying information items. The speech frequency rank is determined from the count value: the larger the count value, the higher the speech frequency rank. The speech frequency rank is then supplied to the frame memory control portion 41.

If it is determined, based on the speech frequency rank and the minimum number Xmin of memory portions of the fame memory, that the value of the speech frequency rank obtained for the conference terminal device in a past predetermined period is equal to or less than the minimum value Xmin, the coding mode selection information for the interframe coding operation is input to the control portion 14. On the other hand, if it is determined that the value of the speech frequency rank for the conference terminal device in the past predetermined period has exceeds the minimum number Xmin at least once, the coding mode selection information for the intra-frame coding operation is input to the control portion 14.

The speaker specifying information items are input to the control portion 14. If it is determined, based on the speaker specifying information items, that the conference terminal device is specified, the control portion 14 controls the respective portions based on the coding mode selecting information from the speech frequency rank determination portion 52 so that interframe coding operation and the intra-coding operation are switched.

In the decoding process unit including the decoding portion and the frame memory 23, the frame memory control portion 41 controls the selectors 26 and 27 so that the selection of a memory portion from the memory portions 23-1~23-n of the frame memory 23. The coded image information from the conference terminal device having the higher speech frequency rank is decoded by the interframe decoding operation using the reference image information for the last one frame stored in a corresponding memory portion of the frame memory 23. An image is then reproduced based on the decoded image information and displayed.

Figure 16:
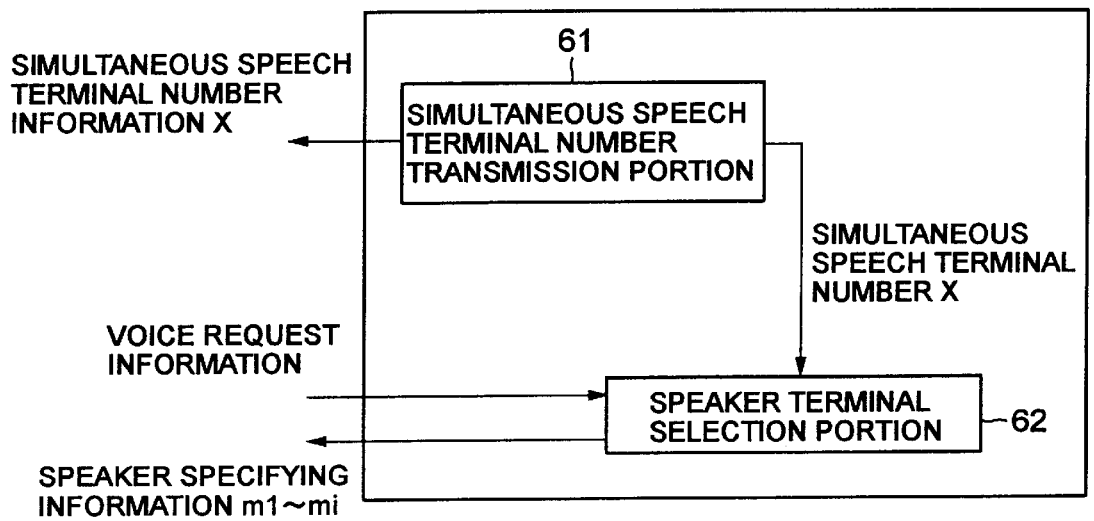
FIG. 16 is a block diagram illustrating the speaker specifying device according to a seventh embodiment of the present invention.

The speaker specifying apparatus according to a seventh embodiment of the present invention is formed as shown in FIG. 16. FIG. 16 shows an essential part of the speaker specifying apparatus 5 shown in FIG. 5. Referring to FIG. 16, the speaker specifying apparatus has a simultaneous speech terminal number transmission portion 61 and a speaker terminal selection portion 62. The simultaneous speech terminal number portion 61 transmits the number of conference terminal devices in which users can simultaneously speak to the conference terminal devices joining in the conference and the speaker terminal selection portion 62. The speaker terminal selection portion 62 selects speakers in accordance with voice request information so that the number of speakers is equal to or less than the number of conference terminal devices in which users can simultaneously speak. The speaker terminal selection portion 62 then transmits the speaker specifying information items m1~mi corresponding to the selected speakers.

In each of the conference terminal devices, if it is determined that the conference terminal device is specified by one of the speaker specifying information items m1~mi, the head frame is coded, first, by the intra-frame coding operation. When the conference terminal device is specified again, the head frame is coded by the interframe coding operation. The coded image information is then transmitted. The number of conference terminal devices in which speakers can simultaneously speak may be previously set or set at the start of the conference in the simultaneous speech terminal number transmission portion 61. The function of the speaker specifying apparatus as described above may be provided in the multi-point control unit 2 shown in FIG. 4.

Figure 17:
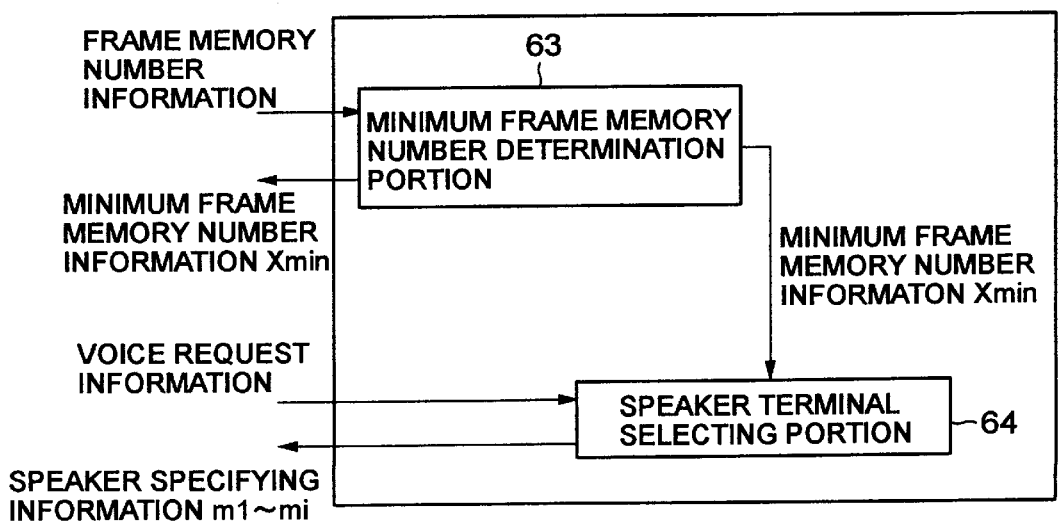
FIG. 17 is a block diagram illustrating the speaker specifying device according to a eighth embodiment of the present invention.

The speaker specifying apparatus according to the eighth embodiment of the present invention is formed as shown in FIG. 17. FIG. 17 shows an essential part of the speaker specifying apparatus 5 shown in FIG. 5. Referring to FIG. 17, the speaker specifying apparatus has a minimum frame memory number determination portion 63 and a speaker terminal selection portion 64. The minimum frame memory number determination portion 63 collects the number of memory portions of the frame memory of the decoding process unit from each of the conference terminal devices. The minimum frame memory number determination portion 63 then determines the minimum number Xmin from the collected numbers of memory portions. The minimum number Xmin is supplied to the respective conference terminal devices and the speaker terminal selection portion 64.

When the speaker terminal selection portion 64 receives voice request information from conference terminal devices, the speaker terminal selection portion 64 selects speakers so that the number of speakers is equal to or less than the minimum number Xmin and transmits the speaker specifying information items m1~mi corresponding to the selected speakers. When the conference terminal device is specified by one of the speaker specifying information items m1~mi, the coded image information is transmitted from the conference terminal device.

Figure 18:
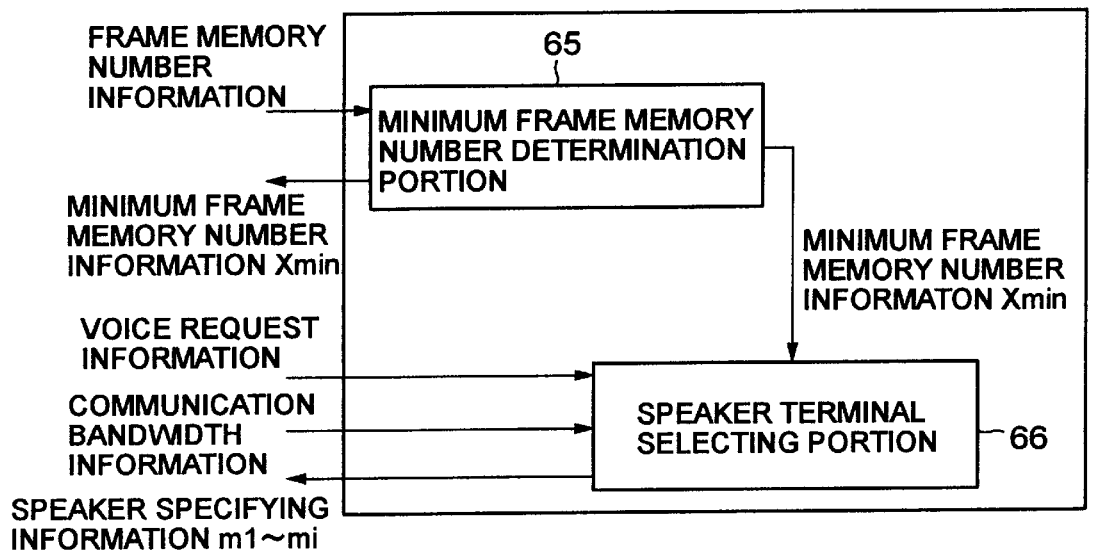
FIG. 18 is a block diagram illustrating the speaker specifying device according to a ninth embodiment of the present invention.

The speaker specifying apparatus according to the ninth embodiment of the present invention is formed as shown in FIG. 18. FIG. 18 shows an essential part of the speaker specifying apparatus shown in FIG. 5. Referring to FIG. 18, the speaker specifying apparatus has a minimum frame memory number determination portion 65 and a speaker terminal selection portion 66. The minimum frame memory number determination portion 65 determines the minimum number Xmin from the numbers of memory portions of the frame memories from the conference terminal devices in the same manner as that shown in FIG. 17. The minimum number Xmin is transmitted to the respective conference terminal devices and the speaker terminal selection portion 66.

The speaker terminal selection portion 66 decides conference terminal devices in which users can simultaneously speak based on the minimum number Xmin from the minimum frame memory number determination portion 65, voice request information from the conference terminal devices and the communication bandwidth information of the network. The speaker terminal selection portion 66 generates and transmits speaker specifying information items m1~mi corresponding to speakers of the decided conference terminal devices. If the communication bandwidth is narrow, the number of conference terminal devices in which users can simultaneously speak may be less than the minimum number Xmin.

Figure 19:
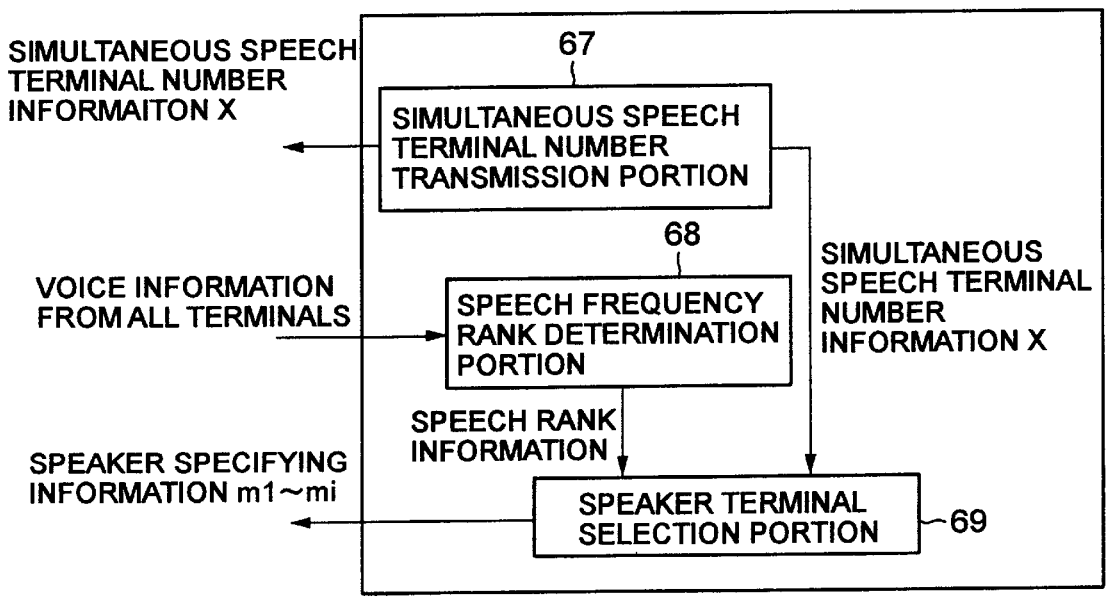
FIG. 19 is block diagram illustrating the speaker specifying device according to a tenth embodiment of the present invention.

The speaker specifying apparatus according to a tenth embodiment of the present invention is formed as shown in FIG. 19. FIG. 19 shows an essential part of the speaker specifying apparatus shown in FIG. 5. Referring to FIG. 19, the speaker specifying apparatus has a simultaneous speech terminal number transmission portion 67, a speech frequency rank determination portion 68 and a speaker terminal selection portion 69. The simultaneous speech terminal number transmission portion 67 transmits the number of conference terminal devices in which users can simultaneously speak to the conference terminal devices and the speaker terminal selection portion 69 in the same manner as that shown in FIG. 16. The number of conference terminal device in which users can simultaneously speak is previously set or set at the start of the conference.

The speech frequency rank determination portion 68 receives the voice information from each of the conference terminal devices. Vice energy corresponding to each of the speakers for a predetermined period is calculated as shown in FIG. 11. The voice energy is ranked in the order of value. The rank of the voice energy is input as the speech frequency rank to the speaker terminal selection portion 69. For example, if an participant repeatedly speaks for the predetermined period, voice energy calculated by the integration of voice levels of speeches for the predetermined period has a large value. Thus, in this case, the speech frequency rank is high.

The speaker terminal selection portion 69 generates the speaker specifying information items m1~mi based on the number of conference terminal devices in which users can simultaneously speak from the simultaneous speech terminal number transmission portion 67 and the speech frequency rank from the speech frequency rank determination portion 68. The speaker specifying information items m1~mi are transmitted to the respective conference terminal devices.

Figure 20:
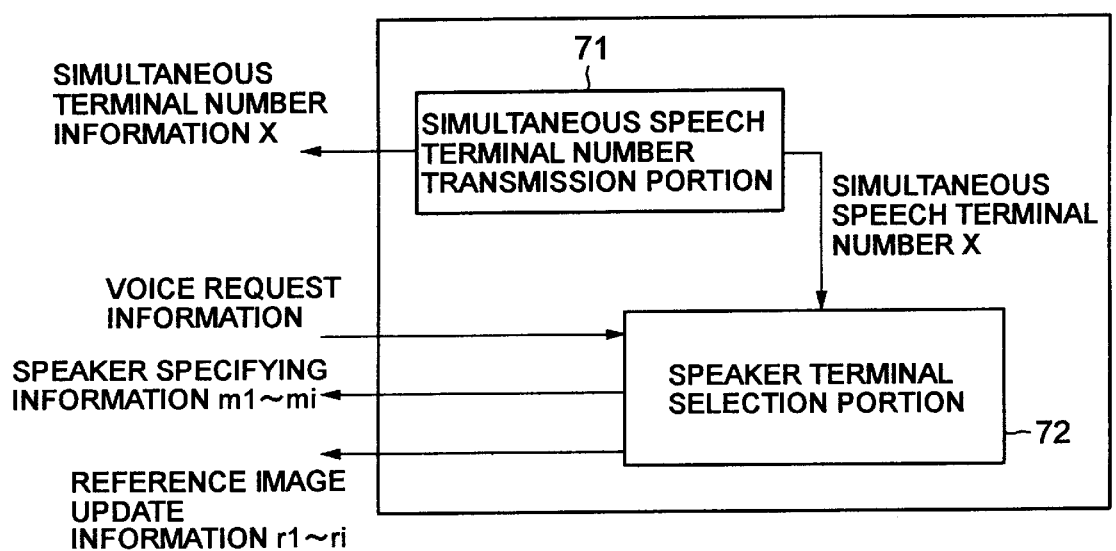
FIG. 20 is a block diagram illustrating the speaker specifying device according to a eleventh embodiment of the present invention.

The speaker specifying apparatus according to an eleventh embodiment of the present invention is formed as shown in FIG. 20. FIG. 20 shows an essential part of the speaker specifying apparatus 5 shown in FIG. 5. Referring to FIG. 20, the speaker specifying apparatus has a simultaneous speech terminal number transmission portion 71 and a speaker terminal selection portion 72. The simultaneous speech terminal number transmission portion 71 has the same function as those shown in FIGS. 16 and 19.

The speaker terminal selection portion 72 generates the speaker specifying information items mlmi based on the number of conference terminal devices in which users can simultaneously speak from the simultaneous speech terminal number transmission portion 71 and voice requests from the conference terminal devices. If the number of conference terminal devices outputting the voice requests exceeds the number of conference terminal devices in which the users can simultaneously speak, the following operation is carried out. A conference terminal device first transmitting a voice request is removed from the conference terminal devices to be specified and a conference terminal device transmitting a new voice request is added to the conference terminal devices to be specified. When the conference terminal device which was removed from the conference terminal devices to be specified is specified again, reference image update request information is transmitted. In another case, the voice request is totaled in a predetermined period and the speech frequency rank is decided. When the conference terminal device is specified again under a condition of a lower speech frequency rank, a speaker specified information item and reference image information update request information are transmitted to the conference terminal device. The conference terminal device codes the head frame in the intra-frame coding operation and transmits the coded image information.

The function of the speaker specifying apparatus as shown in each of FIGS. 17, 18, 19 and 20 may be provided in the multi-point control unit 2 shown in FIG. 4. In FIG. 5, one of the conference terminal devices may have the function of the speaker specifying apparatus as described above. In addition, the present invention is not limited to the above embodiments, and any embodiments may be combined and other variations and modifications may be made without departing from the scope of the claimed invention.

The present application is based on Japanese priority application No. 10-021661 filed on Feb. 3, 1998, the entire contents of which are hereby incorporated by reference.

What is claimed is:

1. A multi-point conference system comprising:
a plurality of conference terminal devices coupled to each other, image information and voice information being transmitted among said plurality of conference terminal devices so that users of said plurality of conference terminal devices are in conference with each other, wherein each of said plurality of terminal devices comprises:
a coding process unit for coding image information by switching an intra-frame coding operation and an interframe coding operation and transmit coded image information when said each of said plurality of terminal devices is specified by a speaker specifying information item;
a decoding process unit for decoding coded image information by a decoding operation corresponding to the coding operation performed to code the image information; and
frame memory portions which are assigned to conference terminal devices joining in the conference, each of said frame memory portions storing reference image information last decoded, the reference image information being used in the decoding operation corresponding to the interframe coding operation, and
wherein said coding process unit of a transmission side conference terminal device which is specified again by the speaker identifying information item codes image information by the interframe coding operation starting from a head frame, said decoding process unit of a receiving side conference terminal device which receives the coded information from said transmission side conference terminal device decodes the coded information by the decoding operation corresponding to the interframe-coding operation using reference image information last stored in a frame memory portion corresponding to the transmission side conference terminal device.

2. The multi-point conference system as claimed in claim 1 comprising:
a multi-point control unit through which said plurality of conference terminal devices are coupled to each other so that a star-type network is formed, said multi-point control unit having specifying information transmission means for transmitting a speaker specifying information item to each of said plurality of conference terminal devices.

3. The multi-point conference system as claimed in claim 1 comprising:
a speaker specifying apparatus connected with said plurality of conference terminal devices so that a bus-type network is formed, said speaker specifying apparatus having specifying information transmission means for transmitting a speaker specifying information item to each of said plurality of conference terminal devices.

4. The multi-point conference system as claimed in claim 1, wherein said plurality of conference terminal devices are coupled to each other in a bus-type network configuration, one of said plurality of conference terminal devices, functioning as a master, having specifying information transmission means for transmitting a speaker specifying information item to each of other conference terminal devices.

5. The multi-point conference system as claimed in claim 2, wherein said specifying information transmission means generates speaker specifying information items to be transmitted based on a number of conference terminal devices in which users can simultaneously speak in the conference and voice requests from conference terminal devices so that a number of speaker specifying information items is equal to or less than the number of conference terminal devices in which users can simultaneously speak in the conference.

6. The multi-point conference system as claimed in claim 3, wherein said specifying information transmission means generates speaker specifying information items to be transmitted based on a number of conference terminal devices in which users can simultaneously speak in the conference and voice requests from conference terminal devices so that a number of the speaker specifying information items is equal to or less than the number of conference terminal devices in which users can simultaneously speak in the conference.

7. The multi-point conference system as claimed in claim 4, wherein said specifying information transmission means generates speaker specifying information items to be transmitted based on a number of conference terminal devices in which users can simultaneously speak in the conference and voice requests from conference terminal devices so that a number of the speaker specifying information items is equal to or less than the number of conference terminal devices in which users can simultaneously speak in the conference.

8. The multi-point conference system as claimed in claim 2, wherein said specifying information transmission means supplies a minimum number of the numbers of frame memory portions of said plurality of conference terminal devices to the conference terminal devices as the number of conference terminal devices in which users can simultaneously speaks in the conference and generates speaker specifying information items to be transmitted in response to voice requests from conference terminal devices so that a number of the speaker specifying information items is equal to or less than the number of conference terminal devices in which users can simultaneously speak in the conference.

9. The multi-point conference system as claimed in claim 3, wherein said specifying information transmission means supplies a minimum number of the numbers of frame memory portions of said plurality of conference terminal devices to the conference terminal devices as the number of conference terminal devices in which users can simultaneously speaks in the conference and generates speaker specifying information items to be transmitted in response to voice requests from conference terminal devices so that a number of the speaker specifying information items is equal to or less than the number of conference terminal devices in which users can simultaneously speak in the conference.

10. The multi-point conference system as claimed in claim 4, wherein said specifying information transmission means supplies a minimum number of the numbers of frame memory portions of said plurality of conference terminal devices to the conference terminal devices as the number of conference terminal devices in which users can simultaneously speaks in the conference and generates speaker specifying information items to be transmitted in response to voice requests from conference terminal devices so that a number of the speaker specifying information items is equal to or less than the number of conference terminal devices in which users can simultaneously speak in the conference.

11. The multi-point conference system as claimed in claim 2, wherein said specifying information transmission means generates speaker specifying information items to be transmitted in response to voice requests from conference terminal devices so that speeches of users who simultaneously speak in conference at conference terminal devices specified by the speaker specifying information items can be transmitted in a communication bandwidth of the network.

12. The multi-point conference system as claimed in claim 3, wherein said specifying information transmission means generates speaker specifying information items to be transmitted in response to voice requests from conference terminal devices so that speeches of users who simultaneously speak in conference at conference terminal devices specified by the speaker specifying information items can be transmitted in a communication bandwidth of the network.

13. The multi-point conference system as claimed in claim 4, wherein said specifying information transmission means generates speaker specifying information items to be transmitted in response to voice requests from conference terminal devices so that speeches of users who simultaneously speak in conference at conference terminal devices specified by the speaker specifying information items can be transmitted in a communication bandwidth of the network.

14. The multi-point conference system as claimed in claim 2, wherein said specifying information transmission means calculates a speech frequency rank based on a number of times that the conference terminal device is specified by the speaker specifying information item in a predetermined period and transmits reference image update request information, indicating that the head frame should be coded by the intra-frame coding operation, after the speech frequency rank has become, at least once, lower than a rank representing by the number of conference terminal devices in which users can simultaneously speak in the conference.

15. The multi-point conference system as claimed in claim 3, wherein said specifying information transmission means calculates a speech frequency rank based on a number of times that the conference terminal device is specified by the speaker specifying information item in a predetermined period and transmits reference image update request information, indicating that the head frame should be coded by the intra-frame coding operation, after the speech frequency rank has become, at least once, lower than a rank represented by the number of conference terminal devices in which users can simultaneously speak in the conference.

16. The multi-point conference system as claimed in claim 4, wherein said specifying information transmission means calculates a speech frequency rank based on a number of times that the conference terminal device is specified by the speaker specifying information item in a predetermined period and transmits reference image update request information, indicating that the head frame should be coded by the intra-frame coding operation, after the speech frequency rank has become, at least once, lower than a rank represented by the number of conference terminal devices in which users can simultaneously speak in the conference.

17. A conference terminal device used in a multi-point conference system in which users of conference terminal devices are in a conference with each other, comprising:
a coding process unit for coding image information; and
a decoding process unit for decoding coded image information, wherein said coding process unit comprises:
coding means for coding the image information by an intra-frame coding operation or an interframe coding operation; and a coding control portion for switching the intra-frame coding operation and the interframe coding operation in said coding means when said conference terminal device is specified by a speaker specifying information item and performing transmission control to transmit coded image information, and wherein said decoding process unit comprises:

a plurality of frame memory portions corresponding to conference terminal devices joining in the conference;

a selector for selecting a frame memory portion, corresponding to another conference terminal device from which coded image information is received, from among said plurality of frame memory portions;

a decoding control portion for controlling said selector; and decoding means for decoding received coded image information by a decoding operation corresponding to either the intra-frame coding operation or the interframe coding operation.

18. The conference terminal device as claimed in claim 17, wherein said coding process unit codes a head frame of the image information by the intra-frame coding operation and switches the intra-frame coding operation to the interframe coding operation from the next frame of the image information when the conference terminal device is specified by the speaker specifying information item and reference image update request information is received, and wherein said coding process portion codes the image information by the interframe coding operation from the head frame when the reference image update request information is not received.

19. The conference terminal device as claimed in claim 17, wherein said coding process unit receives the speaker specifying information items and a number of conference terminal devices in which users can simultaneously speak in the conference, said coding process unit comprising:

a speech frequency determination portion for deciding a speech frequency rank based on numbers of times that conference terminal devices joining in the conference are specified in a predetermined period, and outputting first operating mode selecting information when the conference terminal device is specified again by the speaker specifying information item after the speech frequency rank has become, at least once, lower than a rank represented by the number of conference terminal devices in which users can simultaneously speak in the conference and second operating mode selecting information when the conference terminal device is specified again by the speaker specifying information item under a condition in which the speech frequency rank has not yet been lower than a rank represented by the number of conference terminal devices in which users can simultaneously speak in the conference, the first operating mode selecting information corresponding to the intra-frame coding operation, the second operating mode selecting information corresponding to the interframe coding operation.

20. The conference terminal device as claimed in claim 19, wherein said speech frequency determination portion uses a minimum number of numbers of frame memory portions of the decoding process units of the conference terminal devices joining in the conference as the number of conference terminal devices in which users can simultaneously speak in the conference.

21. The conference terminal device as claimed in claim 19, wherein said speech frequency determination portion calculates the number of conference terminal devices in which users can simultaneously speak in the conference based on a communication bandwidth of a network connected with the conference terminal devices.

22. The conference terminal device as claimed in claim 17, wherein each of said plurality of frame memory portions of said decoding process unit holds reference image information used to decode interframe coded image information until a next interframe coded image information is received.

23. The conference terminal device as claimed in claim 17, wherein said decoding process unit comprises:

a speech frequency measuring portion calculates a speech frequency rank for each of speakers based on the received speaker specifying information items; and a frame memory assigning portion for assigning the frame memory portions to conference terminal devices of the speakers in order of speech frequency rank obtained by said speech frequency measuring portion.

* * * * *